(12) United States Patent
Nasuno et al.

(10) Patent No.: US 12,704,799 B2
(45) Date of Patent: Aug. 11, 2026

(54) ELECTROPHOTOGRAPHIC ROLLER, PROCESS CARTRIDGE, ELECTROPHOTOGRAPHIC IMAGE FORMING APPARATUS, AND METHOD FOR MANUFACTURING ELECTROPHOTOGRAPHIC ROLLER

(71) Applicant: CANON KABUSHIKI KAISHA, Tokyo (JP)

(72) Inventors: Yuki Nasuno, Shizuoka (JP); Yoshitaka Suzumura, Shizuoka (JP); Atsushi Noguchi, Shizuoka (JP); Kazuaki Nagaoka, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/039,263

(22) Filed: Jan. 28, 2025

(65) Prior Publication Data

US 2025/0244693 A1 Jul. 31, 2025

(30) Foreign Application Priority Data

Jan. 29, 2024 (JP) ................................ 2024-010957

(51) Int. Cl.
*G03G 15/00* (2006.01)
*C08G 18/48* (2006.01)
(Continued)

(52) U.S. Cl.
CPC ..... *G03G 15/0818* (2013.01); *C08G 18/4854* (2013.01); *C08L 33/08* (2013.01);
(Continued)

(58) Field of Classification Search
CPC .......... G03G 15/0233; G03G 15/0291; G03G 15/0818; G03G 15/1685; G03G 21/1814;
(Continued)

(56) References Cited

U.S. PATENT DOCUMENTS 7,398,040 B2 7/2008 Yoshida
7,727,134 B2 6/2010 Nakamura et al.
(Continued)

FOREIGN PATENT DOCUMENTS

EP 3974909 A1 * 3/2022 ........ G03G 21/1814
JP 54-11358 A 8/1979
(Continued)

OTHER PUBLICATIONS

U.S. Appl. No. 19/039,297, filed Jan. 28, 2025, Atsushi Noguchi.
U.S. Appl. No. 19/039,368, filed Jan. 28, 2025, Yoshitaka Suzumura.

*Primary Examiner* — Sophia S Chen
(74) *Attorney, Agent, or Firm* — VENABLE LLP

(57) ABSTRACT

An electrophotographic roller has a substrate with a conductive outer surface. A resin layer is provided on a side of the outer surface of the substrate, in which the volume resistivity of the outer surface of the electrophotographic roller is $1.0\times10^6$ Ω·cm or higher, when a corona discharger having a grid part is relatively moved along the axial direction of the electrophotographic roller to charge the electrophotographic roller, and the potentials of the outer surface after 0.06 seconds from passage of the grid part are measured, when a maximum value of the potentials is lower than 20.0 V, the ionization potential of the outer surface of the electrophotographic roller is 5.0 to 5.6 eV, and an elastic modulus E1 in a region from the outer surface of the electrophotographic roller to a depth of 0.1 μm is 200 MPa or higher.

13 Claims, 8 Drawing Sheets

(51) Int. Cl.

| | |
|---|---|
| ***C08L 33/08*** | (2006.01) |
| ***C08L 75/04*** | (2006.01) |
| ***G03G 15/02*** | (2006.01) |
| ***G03G 15/08*** | (2006.01) |
| ***G03G 15/16*** | (2006.01) |
| ***G03G 21/18*** | (2006.01) |

(52) U.S. Cl.
CPC .......... *C08L 75/04* (2013.01); *G03G 15/0233* (2013.01); *G03G 15/0291* (2013.01); *G03G 15/1685* (2013.01); *G03G 21/1814* (2013.01); *G03G 2215/026* (2013.01); *G03G 2215/0861* (2013.01); *G03G 2215/0863* (2013.01)

(58) Field of Classification Search
CPC ..... G03G 2215/026; G03G 2215/0861; G03G 2215/0863; C08L 33/08; C08L 75/04; C08F 220/24; C08F 230/08; C08G 18/283; C08G 18/4854; C08G 18/7664; C08G 2270/00; C08G 2290/00; C09D 175/08
See application file for complete search history.

(56) References Cited

U.S. PATENT DOCUMENTS

| | | | |
|---|---|---|---|
| 7,797,833 | B2 | 9/2010 | Nakamura et al. |
| 8,745,870 | B2 | 6/2014 | Kawamura et al. |
| 9,625,854 | B2 | 4/2017 | Koyanagi et al. |
| 9,846,407 | B2 | 12/2017 | Nakamura et al. |
| 10,571,825 | B1 | 2/2020 | Urushihara et al. |
| 10,678,161 | B2 | 6/2020 | Tsuru et al. |
| 10,705,449 | B2 | 7/2020 | Ishida et al. |
| 10,712,684 | B2 | 7/2020 | Wakabayashi et al. |
| 10,831,126 | B2 | 11/2020 | Matsunaga et al. |
| 10,831,127 | B2 | 11/2020 | Utsuno et al. |
| 10,942,471 | B2 | 3/2021 | Ogawa et al. |
| 11,256,191 | B2 | 2/2022 | Takeno et al. |
| 11,360,405 | B2 | 6/2022 | Tomono et al. |
| 11,360,426 | B2 | 6/2022 | Suzumura et al. |
| 11,465,383 | B2 | 10/2022 | Yamaguchi et al. |
| 11,650,516 | B2 | 5/2023 | Uesugi et al. |
| 12,158,724 | B2 | 12/2024 | Nishi et al. |
| 2014/0308609 | A1 | 10/2014 | Nakazato |
| 2015/0177642 | A1 | 6/2015 | Yoneima et al. |
| 2015/0248101 | A1 | 9/2015 | Hayashi et al. |
| 2022/0244658 | A1 | 8/2022 | Yamada et al. |
| 2023/0161275 | A1 | 5/2023 | Uno et al. |
| 2024/0004326 | A1 | 1/2024 | Sasaki et al. |
| 2024/0301236 | A1 | 9/2024 | Noguchi et al. |
| 2025/0314988 | A1 | 10/2025 | Hongo et al. |

FOREIGN PATENT DOCUMENTS

| | | | |
|---|---|---|---|
| JP | 3-145675 | A | 6/1991 |
| JP | 3-233479 | A | 10/1991 |
| JP | 5-11599 | A | 1/1993 |
| JP | 6-282157 | A | 10/1994 |
| JP | 9-190074 | A | 7/1997 |
| JP | 2006-243057 | A | 9/2006 |
| JP | 2007-108500 | A | 4/2007 |
| JP | 2007-192891 | A | 8/2007 |
| JP | 2008-165214 | A | 7/2008 |
| JP | 2010-210794 | A | 9/2010 |
| JP | 2013-152446 | A | 8/2013 |
| JP | 2014-197064 | A | 10/2014 |
| JP | 5968257 | B2 | 8/2016 |
| JP | 2017-49282 | A | 3/2017 |
| JP | 2018-5107 | A | 1/2018 |
| JP | 6510936 | A | 5/2019 |
| JP | 2020-166227 | A | 10/2020 |

* cited by examiner

ELECTROPHOTOGRAPHIC ROLLER, PROCESS CARTRIDGE, ELECTROPHOTOGRAPHIC IMAGE FORMING APPARATUS, AND METHOD FOR MANUFACTURING ELECTROPHOTOGRAPHIC ROLLER

BACKGROUND OF THE INVENTION

Field of the Invention

The present invention relates to an electrophotographic roller, a process cartridge, an electrophotographic image forming apparatus, and a method for manufacturing an electrophotographic roller.

Description of the Related Art

A further increase in the process speed of an electrophotographic image forming apparatus makes it conceivable to apply a high voltage to a toner layer thickness-regulating member brought into contact with an electrophotographic roller and make a toner rapidly carry charges by injecting the charges thereinto from the toner layer thickness-regulating member. Here, one of the problems in the case of applying a higher voltage to the toner layer thickness-regulating member and making the toner carry charges is the excess charging (charge-up) of the toner, which is the toner being made to carry more charges than necessary.

In Japanese Patent Application Publication No. 2007-192891, the nip passage time, diameters, average circularity, and standard deviation of circularity of a toner are regulated, and the toner is made to carry charges by applying a voltage having the same polarity as the polarity of the toner and an absolute value of 100 to 500 V to the toner on an electrophotographic roller. A technique for improving charging stability and preventing the occurrence of fogging and a decrease in the image density by making the toner carry charges as described above is disclosed.

In addition, Japanese Patent Application Publication No. 2017-049282 discloses a technique for preventing the excess charging of a toner under a low-temperature and low-humidity environment by adding a copolymer containing a silicone group, a fluorine group, and a (meth)acrylate in the molecule to a surface layer as a surface modifier of an electrophotographic roller.

SUMMARY OF THE INVENTION

Therefore, the present inventors studied the application of the electrophotographic roller according to Japanese Patent Application Publication No. 2017-049282 to an electrophotographic image forming apparatus including a toner layer thickness-regulating member to which a high voltage could be applied. However, the present inventors recognized that in the case of making the toner on the electrophotographic roller according to Japanese Patent Application Publication No. 2017-049282 carry charges with the toner layer thickness-regulating member to which a high voltage was applied, there were cases where excess charging occurred under a low-temperature and low-humidity environment.

For the charging of a toner in electrophotography, frictional charging between the toner and the toner layer thickness-regulating member and between the toner and the electrophotographic roller is used. However, the degree of frictional charging is likely to be affected by the ambient environment. Particularly, in a low-temperature and low-humidity environment, the excess charging of the toner occurs, and the charge distribution becomes broad. The excessively-charged toner has a strong image force between the surface of the electrophotographic roller and the toner, and there is thus a tendency that the excessively-charged toner continuously adheres onto the electrophotographic roller. As a result, the surface potential of the electrophotographic roller changes, which makes the density of a halftone image dense in some cases.

The present disclosure is directed to an electrophotographic roller that is, capable of reducing the excessive charging of a toner even in the case of using an electrophotographic image forming apparatus in which a high voltage is applied to a toner layer thickness-regulating member under a low-temperature and low-humidity environment, is less likely to cause charge leakage from the toner even in a high-temperature and high-humidity environment, and is capable of realizing a sharp charge distribution. In addition, the present disclosure has an aim of a process cartridge and an electrophotographic image forming apparatus that includes the electrophotographic roller. In addition, the present disclosure has an aim of a method for manufacturing the electrophotographic roller.

The present disclosure relates to an electrophotographic roller comprising:

- a substrate having a conductive outer surface; and
- a resin layer that is present on a side of the outer surface of the substrate, wherein
- a volume resistivity when a metal film is directly provided on the outer surface of the electrophotographic roller and a direct voltage of 50 V is applied thereto under an environment of a temperature of 23° C. and a relative humidity of 50% is $1.0\times10^6$ Ω·cm or higher,
- when a corona discharger having a 3.0 mm-wide grid part is disposed under an environment of a temperature of 23° C. and a relative humidity of 50% such that a distance between the grid part and the outer surface of the electrophotographic roller reaches 1.0 mm and a width direction of the grid part and an axial direction of the electrophotographic roller coincide with each other, a voltage of 8 kV is applied to the grid part, the corona discharger is relatively moved along the axial direction of the electrophotographic roller at a rate of 400 mm/second to charge the outer surface of the electrophotographic roller, and potentials of the outer surface after 0.06 seconds from passage of the grid part are measured, a maximum value of the potentials is lower than 20.0 V,
- when an object is irradiated with an ultraviolet ray at a light intensity of 800 nW, and a threshold energy of photoelectron emission at which an ionization potential measurement curve rapidly rises is regarded as an ionization potential, the ionization potential of the outer surface of the electrophotographic roller is 5.0 to 5.6 eV, and
- an elastic modulus E1 in a region from the outer surface of the electrophotographic roller to a depth of 0.1 μm that is measured in a thickness-direction cross section of the resin layer of the electrophotographic roller is 200 MPa or higher.

The present disclosure relates to a process cartridge that is configured to be detachable from a main body of an electrophotographic image forming apparatus, wherein, the process cartridge has a toner, a developing roller, a toner layer thickness-regulating member that comes into contact with the developing roller, regulates a layer thickness of the toner that is carried on the developing roller, and is at least partially conductive, and a contact point electrically connected to the toner layer thickness-regulating member, wherein, the toner layer thickness-regulating member is at least partially conductive, the contact point is electrically connected to a main body contact point of the main body of the electrophotographic image forming apparatus and enables a predetermined voltage to be applied to the toner layer thickness-regulating member when the process cartridge has been mounted in the main body of the electrophotographic image forming apparatus, and the developing roller is the above electrophotographic roller.

The present disclosure relates to an electrophotographic image forming apparatus, comprising:

a photosensitive member;

a toner; and a developing roller that supplies the toner to an electrostatic latent image that is formed on the photosensitive member, wherein the developing roller is the above electrophotographic roller.

The present disclosure relates to a method for manufacturing the above electrophotographic roller, wherein the method comprises a step of preparing the substrate having a conductive outer surface; and a step of forming the resin layer on a side of the outer surface of the substrate, the step of forming the resin layer includes a step of obtaining a crosslinked urethane resin by applying and curing an urethane raw material mixture comprising an urethane raw material that forms the crosslinked urethane resin and a surface modifier, and the surface modifier has a weight-average molecular weight Mw of 200 to 3000.

The present disclosure can provide an electrophotographic roller that is capable of reducing the excessive charging of a toner even in the case of using an electrophotographic image forming apparatus in which a high voltage is applied to a toner layer thickness-regulating member under a low-temperature and low-humidity environment, is less likely to cause charge leakage from the toner even in a high-temperature and high-humidity environment, and is capable of realizing a sharp charge distribution.

Further features of the present invention will become apparent from the following description of exemplary embodiments with reference to the attached drawings.

DESCRIPTION OF THE EMBODIMENTS

Figure 1:
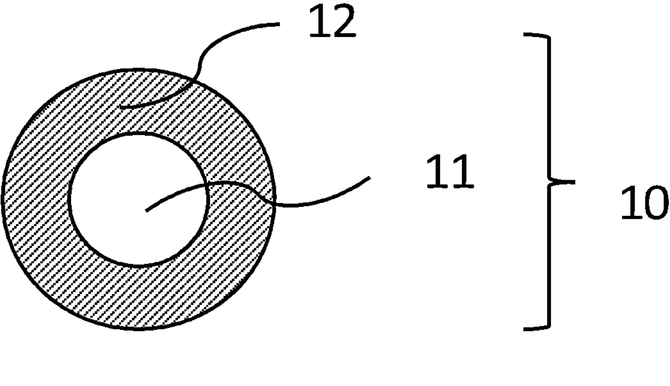
FIG. 1 is a schematic cross-sectional view showing an example of an electrophotographic roller according to the present disclosure.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. In addition, in the present disclosure, for example, descriptions such as "at least one selected from the group consisting of XX, YY and ZZ" mean any of XX, YY, ZZ, the combination of XX and YY, the combination of XX and ZZ, the combination of YY and ZZ, and the combination of XX, YY, and ZZ.

The present inventors assumed the reason for the combination of an electrophotographic roller according to Japanese Patent Application Publication No. 2017-049282 with a toner layer thickness-regulating member to which a high voltage is applied being not capable of sufficiently preventing the excess charging of a toner under a low-temperature and low-humidity environment as described below.

In the electrophotographic roller according to Japanese Patent Application Publication No. 2017-049282, a (meth) acrylate copolymer containing a silicone group and a fluorine group in the molecule has been added to a resin layer as a surface modifier. This addition makes the ionization potential of the electrophotographic roller close to the ionization potential of the toner, which is considered to reduce frictional charging. The details of ionization potential will be described below. However, in the case of making the toner carry charges with the toner layer thickness-regulating member to which a high voltage has been applied under a low-temperature and low-humidity environment, the effect of the electrophotographic roller according to Japanese Patent Application Publication No. 2017-049282 becomes insufficient in some cases.

That is, it was found that, under a low-temperature and low-humidity environment, there is a need to prevent excess charging by reducing frictional charging as much as possible and to maximize the injection of charges from the toner layer thickness-regulating member to obtain sufficient charges in the toner. The present inventors repeated studies with such recognition and consequently found that an electrophotographic roller satisfying the following four requirements is needed.

Requirement (1)

The volume resistivity when a metal film is directly provided on the outer surface of the electrophotographic roller and a direct voltage of 50 V is applied thereto under an environment of a temperature of 23° C. and a relative humidity of 50% is $1.0\times10^6$ Ω·cm or higher.

Requirement (2)

When a corona discharger having a 3.0 mm-wide grid part is disposed under an environment of a temperature of 23° C. and a relative humidity of 50% such that the distance between the grid part and the outer surface of the electrophotographic roller reaches 1.0 mm and the width direction of the grid part and the axial direction of the electrophotographic roller coincide with each other, a voltage of 8 kV is applied to the grid part, the corona discharger is relatively moved along the axial direction of the electrophotographic roller at a rate of 400 mm/second to charge the outer surface of the electrophotographic roller, and the potentials of the outer surface after 0.06 seconds from the passage of the grid part are measured, the maximum value of the potentials is lower than 20.0 V.

Requirement (3)

When an object is irradiated with an ultraviolet ray at a light intensity of 800 nW, and the threshold energy of photoelectron emission at which the ionization potential measurement curve rapidly rises is regarded as the ionization potential, the ionization potential of the outer surface of the electrophotographic roller is 5.0 to 5.6 eV.

Requirement (4)

The elastic modulus in a region from the outer surface of the electrophotographic roller to a depth of 0.1 μm that is measured in a thickness-direction cross section of a resin layer of the electrophotographic roller is 200 MPa or higher.

Hereinafter, the details of the above-described requirements (1) to (4) will be described.

Technical Meaning of Requirement (1)

In the requirement (1), the numerical value of the volume resistivity of the electrophotographic roller is regulated. The volume resistivity is a physical property value indicating charge leakage from a toner to the electrophotographic roller. In a region where the toner layer thickness-regulating member and the electrophotographic roller come into contact with each other through a toner, a higher voltage is applied to the toner layer thickness-regulating member than to the electrophotographic roller. Therefore, a force of pushing toward the electrophotographic roller is exerted on the toner. As a result, the charges in the toner are likely to leak toward the electrophotographic roller, and there is a case where image quality deterioration called "fogging", in which the toner is transferred to a solid white part image on paper, is not completely resolved due to a decrease in the amount of charge in the toner.

The volume resistivity of the electrophotographic roller is $1.0\times10^{6}$ Ω·cm or higher. Within the above-described range, the leakage of charges from the toner to the electrophotographic roller is suppressed, and a decrease in the amount of charge in the toner can be prevented even when a high bias toward the toner layer thickness-regulating member has been applied. The volume resistivity of the electrophotographic roller is preferably $1.0\times10^{8}$ Ω·cm or higher. The upper limit of the volume resistivity is not particularly limited and is, for example, $1.0\times10^{13}$ Ω·cm or lower and more preferably $1.0\times10^{11}$ Ω·cm or lower.

The volume resistivity of the electrophotographic roller can be controlled with the content rate of a conductive filler. Specifically, volume resistance can be increased by decreasing the content rate of the conductive filler. The content rate is preferably controlled so that a desired volume resistance is obtained. In a case where the conductive filler is carbon black, the content rate thereof is preferably 5.0 to 45 parts by mass relative to 100 parts by mass of a resin component that forms a resin layer.

The volume resistivity is measured using an electrical resistance measuring instrument. A load of 4.9 N is applied to each of both ends of the axial core body of the electrophotographic roller to install the electrophotographic roller to be in contact with a metal drum having a diameter of 50 mm, the metal drum is rotated at a surface rate of 50 mm/sec, and the electrophotographic roller is driven to rotate. A resistor R having a known electrical resistance that is lower than the electrical resistance of the electrophotographic roller by two orders of magnitude or more is connected between the metal drum and the ground. A voltage of +50 V is applied to the axial core body of the electrophotographic roller from a high-voltage power supply HV, and the potential difference between both ends of the resistor R is measured using a digital multimeter DMM (189 TRUE RMS MULTIMETER manufactured by Fluke Corporation).

A current that has flowed into the metal drum through the electrophotographic roller is obtained by calculation from the measured value of the potential difference and the electrical resistance of the resistor R, and the electrical resistance value of the electrophotographic roller is obtained by calculation from the current and the applied voltage of 50 V. In the measurement with the digital multimeter, sampling is performed for three seconds after two seconds from the application of the voltage, and a value that is calculated from the average value thereof is regarded as the resistance value of the electrophotographic roller. Subsequently, the area of the contact part between the electrophotographic roller and the metal drum is calculated. The volume resistivity of the electrophotographic roller is calculated from the resistance value of the electrophotographic roller, the area of the contact part, and the thickness of rubber of the electrophotographic roller.

Technical Meaning of Requirement (2)

In the requirement (2), the surface potential of the electrophotographic roller is regulated. The surface potential of the electrophotographic roller indicates residual charges on the surface of the electrophotographic roller and is a physical property value indicating the degree of the excess charging of a toner. A toner carrying charges is electrically attracted to the surface of the electrophotographic roller. When the surface potential of the surface of the electrophotographic roller becomes high, this electrical adhesive force becomes strong, and the toner having a high adhesive force continuously adheres to the electrophotographic roller. As a result, the contact opportunity between the toner and the electrophotographic roller increases, the amount of frictional charging increases, and the excess charging of the toner thus occurs.

The surface potential of the electrophotographic roller is lower than 20.0 V. When this range is satisfied, the electrical adhesive force between the toner and the electrophotographic roller is suppressed. Therefore, the contact opportunity between the toner and the electrophotographic roller decreases, whereby the amount of frictional charging decreases, and the excess charging of the toner can be suppressed.

After 0.06 seconds from the passage of the grid part of the corona discharger, a type of machine having a fast process speed is imitated.

In the measurement of the surface potential, when a voltage of 8 kV is applied to the grid part, and the corona discharger is relatively moved along the axial direction of the electrophotographic roller at a rate of 400 mm/second, the maximum value after 0.06 seconds from the passage of the grid part of the corona discharger is regarded as the surface potential of the electrophotographic roller.

The surface potential of the electrophotographic roller is preferably 10.0 V or lower and more preferably 7.0 V or lower. The maximum value of the potential of the outer surface is preferably as low as possible, and the lower limit is not particularly limited. The surface potential of the electrophotographic roller is, for example, 0 to 20.0 V, preferably 1.0 to 10.0 V, and more preferably 1.5 to 7.0 V.

The surface potential of the electrophotographic roller can be controlled with the content rate of the conductive filler and the content rate and weight-average molecular weight of a surface modifier. The content rate of the conductive filler is preferably controlled so that a desired surface potential is obtained. In a case where the conductive filler is carbon black, the content rate thereof is preferably 5.0 to 45 parts by mass relative to 100 parts by mass of the resin component that forms the resin layer. In addition, when the amount of the surface modifier blended is set to 1.0 to 5.0 parts by mass relative to 100 parts by mass of the resin that configures the resin layer, and the weight-average molecular weight is set to 3000 or lower, it is possible to suppress the surface modifier oozing onto the surface of the electrophotographic roller. As a result, it is possible to suppress an insulating film being formed on the surface of the electrophotographic roller, and the surface potential is easily suppressed at a low level.

Technical Meaning of Requirement (3)

In the requirement (3), the ionization potential of the outer surface of the electrophotographic roller is regulated. This ionization potential is a physical property value indicating the frictional chargeability of the electrophotographic roller. When two substances having different ionization potentials are brought into contact with each other, electrons migrate from a substance having a lower ionization potential to a substance having a higher ionization potential. As a result, the substance having a lower ionization potential is positively charged, and the substance having a higher ionization potential is negatively charged.

Ordinarily, in a case where the toner is a negatively charged toner, the ionization potential of the toner is often a high value, and the range thereof is normally 5.0 to 5.6 eV. Incidentally, the ionization potential of the outer surface of the electrophotographic roller of the present disclosure is within a range of 5.0 to 5.6 eV. That is, the ionization potential difference between the toner and the surface of the electrophotographic roller is small. Therefore, when the toner and the electrophotographic roller are brought into contact with each other, it is possible to suppress charges migrating from the electrophotographic roller to the toner due to frictional charging. Particularly, under a low-temperature and low-humidity environment, it is possible to reduce the excess charging of the toner.

When the ionization potential of the outer surface of the electrophotographic roller is lower than 5.0 eV, the image density stability in a low-temperature and low-humidity environment is likely to deteriorate. When the ionization potential of the outer surface of the electrophotographic roller is higher than 5.6 eV, the toner is positively charged due to frictional charging when the toner and the electrophotographic roller come into contact with each other. As a result, fogging is likely to occur due to the lack of charges in the toner.

The ionization potential of the outer surface of the electrophotographic roller is preferably 5.3 to 5.6 eV. The toner is preferably a negatively charged toner.

The outline of the measurement of the ionization potential is as described below. A wavelength of an ultraviolet ray radiated from an ultraviolet lamp is selected with a spectrometer and is radiated on the surface of a specimen. When the energy of a photon becomes large, a photoelectron is emitted from the specimen substance. The energy value at this time is the ionization potential. Detailed measurement conditions will be described below.

Technical Meaning of Requirement (4)

In the requirement (4), the elastic modulus in a region from the outer surface of the electrophotographic roller to a depth of 0.1 μm is regulated. A high elastic modulus in this region indicates that the hardness of the outermost surface of the electrophotographic roller is high. When the outermost surface of the electrophotographic roller has high hardness, the contact area with the toner becomes narrow. The degree of frictional charging depends on the contact area between the toner and the electrophotographic roller. Therefore, frictional charging can be suppressed when the outermost surface of the electrophotographic roller has high hardness.

In the present disclosure, when an elastic modulus E1 in the region from the outer surface of the electrophotographic roller to a depth of 0.1 μm is 200 MPa or higher, the contact area between the toner and the electrophotographic roller becomes narrow, frictional charging is suppressed, and the excess charging of the toner can be reduced. Therefore, the image density stability in a low-temperature and low-humidity environment is likely to deteriorate.

The elastic modulus E1 is preferably 200 to 800 MPa and more preferably 200 to 400 MPa. The elastic modulus E1 is easily increased by forming an interpenetrating polymer network structure (IPN structure) between a resin in a resin layer and a surface modifier, which will be described below. In addition, the elastic modulus E1 is easily decreased by decreasing the equivalent ratio of the isocyanate group concentration in a polyisocyanate compound to the total active hydrogen group concentration in a polyol. The details of a method for measuring the elastic modulus E1 is as described below.

In order to obtain the effect of the present disclosure, among the above-described requirements, particularly, the requirement (3) is important, but it is important to satisfy the requirements (1), (2), and (4) together with the requirement (3). When the requirements (2) and (4) are satisfied, the contact opportunity between the toner and the electrophotographic roller is reduced, and when the requirement (3) is satisfied, charges in the toner that are generated by friction charging between the toner and the electrophotographic roller can be reduced. A synergistic effect thereof makes it possible to obtain the effect of the present disclosure. In a case where the requirement (1) is not satisfied, charges in the toner are likely to leak into the electrophotographic roller, and there is a case where fogging is not completely suppressed. Furthermore, in a case where any one of the requirements (2) to (4) is not satisfied, an effect of image density stability due to the suppression of excess charging cannot be obtained, and furthermore, an effect of suppressing fogging cannot be obtained in some cases.

Ordinary means for satisfying the requirement (3) in the electrophotographic roller is a material having a high ionization potential being oriented on the surface or a film being formed using a material having a high ionization potential. However, in such a method, the outermost surface is likely to have high resistance, which makes the requirement (2) unsatisfied, or the hardness of the outermost surface is low, which makes it impossible to satisfy the requirement (4), and it is thus difficult to satisfy the requirements (2) to (4). Selection of an appropriate material and manufacturing conditions will be described below.

The electrophotographic roller is capable of providing an electrophotographic roller capable of satisfying the requirements (1) to (4), reducing the excess charging of the toner in the case of using an electrophotographic image forming apparatus, in which a high voltage is applied to a toner layer thickness-regulating member, under a low-temperature and low-humidity environment, and realizing a sharp charge distribution.

Hereinafter, the present disclosure will be described.

Electrophotographic Roller

An electrophotographic roller according to at least one of the aspects of the present disclosure has a conductive substrate and a resin layer on a side of an outer circumferential surface of the substrate.

One example of the electrophotographic roller is shown in FIG. 1. An electrophotographic roller 10 shown in FIG. 1 has a resin layer 12 laminated on the outer surface, which is the outer circumferential surface, of a columnar or hollow cylindrical substrate 11.

Figure 2:
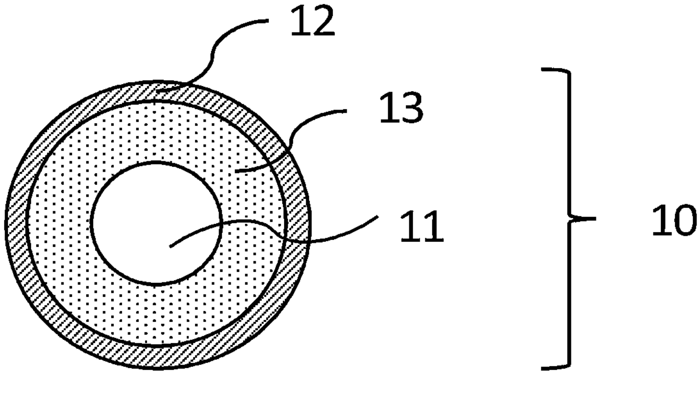
FIG. 2 is a schematic cross-sectional view showing another example of the electrophotographic roller according to the present disclosure.

The layer configuration of the electrophotographic roller is not limited to the form shown in FIG. 1. A different layer may be provided between the substrate 11 and the resin layer 12. Another form of the electrophotographic roller is an electrophotographic roller having an elastic layer 13 as an intermediate layer between the substrate 11 and the resin layer 12 provided on the outer circumferential surface thereof as shown in FIG. 2. The resin layer 12 is, for example, a surface layer. The resin layer 12 is preferably formed on the outer surface of the electrophotographic roller. That is, the outer surface of the resin layer is preferably the outer surface of the electrophotographic roller.

Substrate

The substrate has a conductive outer surface, and functions as a supporting member of the electrophotographic roller, and in some cases, as an electrode. Preferred specific examples of the substrate include a solid cylindrical substrate and a hollow cylindrical substrate.

A material to constitute the substrate may be appropriately selected to be used from materials known in the field of conductive members for electrophotography, and materials that may be used as the electrophotographic roller. Examples of these materials include metals typified by aluminum and stainless steel, carbon steel alloys, conductive synthetic resins, and metals or alloys such as iron, and copper alloys.

Further, the material to constitute the substrate may be oxidized, or plated with chromium, nickel, or the like. As the type of the plating, either of electroplating and electroless plating may be used. Electroless plating is preferable in view of dimensional stability. Examples of the type of electroless plating as used herein include nickel plating, copper plating, gilding, and plating with any kinds of alloys. The thickness of the plating is preferably at least 0.05 μm, and in view of the balance of working efficiency and a rustproof capacity, preferably 0.1 to 30 μm.

A primer may be applied onto the surface of the substrate for achieving the improvement of the adhesiveness between the substrate and the resin layer. A primer as used herein may be selected to be used from known primers according to the rubber material for forming the conductive layer, the material of the support, etc. Examples of the primer include thermosetting resins and thermoplastic resins, and specific examples thereof include materials such as phenolic resins, polyurethane, acrylic resins, polyester resins, polyether resins, and epoxy resins.

Resin Layer

Binder Resin

The resin layer may contain a binder resin. The binder resin in the resin layer is preferably an urethane resin and more preferably a crosslinked urethane resin. The crosslinked urethane resin has excellent flexibility and strength, is capable of forming an interpenetrating polymer network structure (IPN structure), which will be described below, and is thus suitable as a binder.

The urethane resin can be obtained from an urethane raw material containing a polyol, an isocyanate, and a chain extender as necessary. The urethane resin may be a cured product of the urethane raw material or a cured product of a urethane raw material mixture containing the urethane raw material and additives such as a surface modifier and roughness-forming particle. Examples of the polyol that is a raw material of the urethane resin include polyether polyols, polyester polyols, polycarbonate polyols, polyolefin polyols, acrylic polyols, and mixtures thereof. Among them, polyether polyols are preferable.

Examples of the isocyanate that is a raw material of the urethane resin include tolylene diisocyanate (TDI), methylene diphenyl diisocyanate (MDI), naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethylxylylene diisocyanate (TMXDI), cyclohexane diisocyanate, polymeric MDI, and mixtures thereof.

Among them, polymeric MDI is preferable. Here, the polymeric MDI is a mixture of a monomeric MDI and a high-molecular-weight polyisocyanate and is represented by the following formula (A). n in the formula (A) is preferably from 0 to 4.

As the polymeric MDI, a commercially available MDI may be used, and examples thereof include MILLIONATE MR series (manufactured by Tosoh Corporation) such as MILLIONATE MR400 (trade name).

(A)

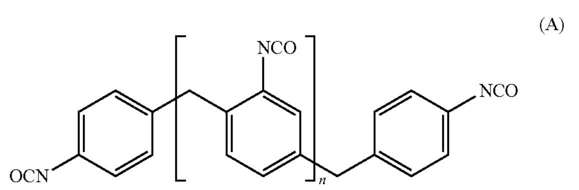

Examples of the chain extender that is a raw material of the urethane resin include difunctional low-molecular-weight diols such as ethylene glycol, 1,4-butanediol, and 3-methylpentanediol; trifunctional low-molecular-weight triols such as trimethylolpropane; and mixtures thereof. In addition, prepolymer-type isocyanate compounds having an isocyanate group at an end that are obtained by reacting a variety of the above-described isocyanate compounds and a variety of the above-described polydiols in advance in a state where isocyanate groups are excessive may also be used. In addition, as these isocyanate compounds, materials obtained by blocking an isocyanate group with a variety of blocking agents, such as MEK oxime, may also be used.

In addition, a monool, such as polyether monool, may also be used in the urethane raw material.

Regardless of materials used, the urethane resin can be obtained by reacting the polyol and the isocyanate by heating. Furthermore, when any one or both of the polyol and the isocyanate have a branched structure and three or more functional groups, the urethane resin to be obtained becomes a crosslinked urethane resin.

Surface Modifier

In order to control the ionization potential of the outer surface of the electrophotographic roller to be within a range of 5.0 to 5.6 eV, it is preferable that a material containing silicon and/or fluorine is cured in the vicinity of the surface in the resin layer and forms an IPN structure, which will be described below, together with the crosslinked urethane resin. Specifically, in the resin layer in the electrophotographic roller, it is preferable to use a surface modifier. The surface modifier is preferably a (meth)acrylate monomer and/or oligomer having at least one or both of a silicone group and a fluorine group in the molecule. That is, the resin layer (preferably a crosslinked acrylic resin) preferably contains at least one group selected from the group consisting of a silicone group and a fluorine group in the molecule.

The use of this makes it easy to control the ionization potential to be within a range of 5.0 to 5.6 eV. Specifically, when the material containing silicon and/or fluorine is added into the resin layer and surface-oriented, it is easy to further increase the ionization potential of the outer surface of the electrophotographic roller. In addition, a surface modifier having a large weight-average molecular weight and being composed of a fluorine group rather than a silicone group has high surface orientation and easily increases the ionization potential.

An acrylate monomer or oligomer that is used here is preferably a polyfunctional monomer or polyfunctional oligomer having a plurality of acryloyl groups or methacryloyl groups as functional groups in order to make the acrylate monomer or oligomer be easily combined into the IPN structure.

The (meth)acrylate monomer or oligomer having a silicone group in the molecule is specifically a (meth)acrylate monomer or oligomer having a structure of the following formula (1). The silicone group preferably has a siloxane structure and more preferably has the structure of the following formula (1).

(1)

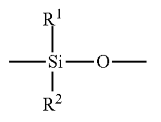

In the formula (1), $R^1$ and $R^2$ each independently represent H or a hydrocarbon group having 1 to 4 carbon atoms (for example, an alkyl group).

Examples of the (meth)acrylate monomer or oligomer having a silicone group in the molecule include silicone (meth)acrylates such as silicone di(meth)acrylate and silicone hexa(meth)acrylate; and trifunctional alkyl alkoxysilanes such as 3-methacryloxypropyltrimethoxysilane.

The (meth)acrylate monomer or oligomer having a fluorine group in the molecule is specifically a (meth)acrylate monomer or oligomer having a structure of the following formula (2). Examples thereof include fluorine-modified acrylates. (Meth)acrylic acid alkyl esters in which at least a part of alkyl groups has been substituted with fluorine can be used.

(2)

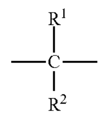

In the formula (2), $R^1$ and $R^2$ each independently represent F or a hydrocarbon group having 1 to 4 carbon atoms (for example, an alkyl group). At least one of $R^1$ and $R^2$ indicates F.

The (meth)acrylate monomer or oligomer having a silicone group and a fluorine group in the molecule is specifically a (meth)acrylate monomer or oligomer having a structure in which at least one of $R^1$ and $R^2$ in the formula (1) is a fluoroalkyl group (having 1 to 4 carbon atoms). Examples thereof include fluorine/acrylic-modified organopolysiloxanes.

From the viewpoint of surface orientation and compatibility at the time of mixing the surface modifier with the raw material of the urethane resin, which is the binder resin, the weight-average molecular weight (Mw) of the surface modifier is preferably 200 to 3000 and more preferably 230 to 2100. When the weight-average molecular weight is 200 or higher, the surface modifier is likely to undergo phase separation in a process of coating and then curing the resin layer and is easily surface-oriented. In addition, when the weight-average molecular weight is 3000 or lower, the surface modifier is likely to be compatible. When the weight-average molecular weight is 3000 or lower, the above-described acrylate monomer or oligomer oozing onto the surface of the electrophotographic roller can be suppressed. Therefore, it is possible to suppress the surface modifier forming an insulating film on the surface of the electrophotographic roller, and it is easy to suppress the surface potential at a low level.

In addition, the amount of the surface modifier blended is preferably 1.0 to 5.0 parts by mass and more preferably 3.0 to 5.0 parts by mass relative to 100 parts by mass of the resin that configures the resin layer.

Crosslinked Acrylic Resin

The resin layer preferably contains the crosslinked urethane resin and a crosslinked acrylic resin. In the resin layer, the crosslinked urethane resin and the crosslinked acrylic resin preferably have an interpenetrating polymer network structure (IPN structure). The IPN structure is defined as a structure in which the network structures of two or more kinds of polymer compounds are not covalently bonded to each other, but are intertwined together. The IPN structure in the resin layer is preferably formed by the crosslinked acrylic resin penetrating into the network of the three-dimensional crosslinked structure of the crosslinked urethane resin.

The crosslinked acrylic resin is hard compared with the crosslinked urethane resin and is thus capable of increasing the hardness of the outermost surface, but the crosslinked acrylic resin alone is insulating and thus extremely increases the surface potential in some cases. In addition, the crosslinked acrylic resin is brittle and is thus likely to generate a scratch due to scraping by rubbing. On the other hand, in the vicinity of the extreme outer surface of the resin layer, in the case of the IPN structure in which the crosslinked acrylic resin has penetrated into the network of the three-dimensional crosslinked structure of the crosslinked urethane resin, hardness and brittleness are hard to develop, and a high strength can be imparted while flexibility is secured.

Furthermore, the crosslinked acrylic resin is preferably formed by the polymerization of the (meth)acrylate monomer or oligomer having a silicone group and/or a fluorine group in the molecule, which is the surface modifier, and a (meth)acrylic monomer by impregnation.

In order to form the IPN structure of the crosslinked acrylic resin and the crosslinked urethane resin on the outer surface of the resin layer and in the vicinity of the outer surface, the following method is preferable. The resin layer containing crosslinked urethane is impregnated with a liquid-form (meth)acrylic monomer. This is cured at the same time as the surface modifier (the (meth)acrylate monomer or oligomer having a silicone group and/or a fluorine group in the molecule) in the resin layer.

In the resin layer, the content of the crosslinked acrylic resin is preferably 1.0 to 5.0 parts by mass and more preferably 3.0 to 5.0 parts by mass relative to 100 parts by mass of the crosslinked urethane resin.

In addition, the thickness of the resin layer is, for example, 3 to 50 μm, preferably 5 to 30 μm, and more preferably 7 to 20 μm.

The kind of the (meth)acrylic monomer that is used here contains a polyfunctional monomer having a plurality of acryloyl groups or methacryloyl groups as functional groups to form a crosslinked structure. As the (meth)acrylic monomer that is used as the crosslinked acrylic resin, a difunctional (meth)acrylic monomer or a trifunctional (meth) acrylic monomer is preferably used, and these are preferably jointly used.

The difunctional (meth)acrylic monomer is preferably at least one selected from the group consisting of alkylene glycol di(meth)acrylate, alkylene oxide (ethylene oxide or propylene oxide)-modified alkylene glycol di(meth)acrylates. Examples thereof include propylene oxide-modified neopentyl glycol tri(meth)acrylate and the like.

Examples of the trifunctional (meth)acrylic monomer include trimethylolpropane tri(meth)acrylate, pentaerythritol tri(meth)acrylate, and the like.

A method for polymerizing the (meth)acrylic monomer is not particularly limited, and a well-known method can be used. Specific examples thereof include methods in which heating, ultraviolet irradiation, or the like is used. A well-known radical polymerization initiator or an ionic polymerization initiator can be used in a variety of polymerization methods.

These polymerization initiators may be used singly or two or more thereof may be jointly used.

As a heating device or an ultraviolet irradiation device, a well-known device can be used as appropriate. As a light source that radiates ultraviolet rays, for example, an LED lamp, a high-pressure mercury lamp, a metal halide lamp, a xenon lamp, a low-pressure mercury lamp, and the like can be used. The accumulated light amount necessary for the polymerization can be adjusted as appropriate depending on the kind or amount added of the compound or polymerization initiator used.

Roughness-Forming Particles (Resin Particles)

For the purpose of forming a protrusion portion on the surface of the electrophotographic roller, resin particle may be added to the resin layer. In the case of providing surface roughness to the resin layer, it is possible to make the resin layer contain fine particle for imparting roughness. Specifically, fine particle of a polyurethane resin, a polyester resin, a polyether resin, a polyamide resin, an acrylic resin, or a polycarbonate resin can be used. These are also preferably crosslinked resin particle. In the case of forming the IPN structure on the outer surface side of the resin layer, the IPN structure is also formed in the crosslinked resin particle in some cases.

The volume-average particle diameter of the fine particle is preferably from 1.0 μm to 30 μm, and the surface roughness (ten-point average roughness) Rzjis that is formed with the fine particle is preferably from 0.1 μm to 20 μm. Rzjis is a value that is measured on the basis of JIS B 0601 (1994). The content of the resin particle is, for example, 1 to 25 parts by mass and preferably 5 to 15 parts by mass relative to 100 parts by mass of the resin component that forms the resin layer.

Conductive Filler

Examples of the conductive filler include the following fillers: carbon-based substances such as carbon black and graphite; metals or alloys such as aluminum, silver, gold, tin-lead alloys, and copper-nickel alloys; metal oxides such as zinc oxide, titanium oxide, aluminum oxide, tin oxide, antimony oxide, indium oxide, and silver oxide; and substances obtained by plating a variety of fillers with a conductive metal such as copper, nickel, or silver. As the conductive filler, carbon black is particularly suitably used since the control of the conductivity is easy and carbon black is inexpensive. As the carbon black, carbon black having relatively small primary particle diameters and maintaining a hydrophobic tendency is particularly suitably used since the uniform dispersibility in the resin layer is favorable.

When the reinforcement performance and conductivity of the resin layer are taken into account, regarding the primary particle diameters of the carbon black, the number-average primary particle diameter is preferably in a range from 20 nm to 60 nm. Regarding the surface characteristics of the carbon black, the pH is preferably from 3.0 to 8.0. In addition, the content rate of the carbon black is preferably from 5 mass parts to 45 mass parts relative to 100 mass parts of the resin component that forms the resin layer.

Other Additives

The resin layer can be made to contain, other than the components thus far described above, a variety of additives, such as a crosslinking agent, a crosslinking assistant, a plasticizer, a filler, an extender, a vulcanizing agent, a vulcanization assistant, an antioxidant, an anti-aging agent, a processing assistant, a dispersant, and a leveling agent, to an extent that the above-described functions are not impaired.

Intermediate Layer (Elastic Layer)

The electrophotographic roller may have an elastic layer as the intermediate layer 13 on the outer surface of the substrate. The electrophotographic roller has the elastic layer, for example, between the substrate and the resin layer. The elastic layer is not particularly limited, and a layer that is well known as an elastic layer for electrophotographic rollers may be used. Examples thereof include cured products of an addition curing-type liquid-form silicone rubber mixture. The thickness of the intermediate layer is, for example, 1.0 to 10.0 mm or 2.0 to 5.0 mm.

As the addition curing-type liquid-form silicone rubber, a well-known rubber can be used, and liquid-form dimethylpolysiloxane having two or more silicon atom-bonded alkenyl groups in one molecule, liquid-form dimethylpolysiloxane having two or more silicon atom-bonded hydrogen atoms in one molecule, and the like can be used. In the addition curing-type liquid-form silicone rubber mixture, a filler, such as carbon black, may also be used.

Method for Producing Resin Layer

A method for manufacturing an electrophotographic roller preferably has a step of preparing a substrate having a conductive outer surface and a step of forming a resin layer on a side of the outer surface of the substrate. The step of forming a resin layer preferably has a step of applying and curing a urethane raw material mixture containing a urethane raw material that forms a crosslinked urethane resin and a surface modifier to obtain a crosslinked urethane resin. Furthermore, it is preferable to impregnate the crosslinked urethane resin with a (meth)acrylic monomer that forms a crosslinked acrylic resin, polymerize the surface modifier and the (meth)acrylic monomer, form a crosslinked acrylic resin, and obtain a resin layer.

The surface modifier is preferably a (meth)acrylate monomer or oligomer having at least one or both of a silicone group and a fluorine group in the molecule as described above. The weight-average molecular weight Mw of the surface modifier is preferably 200 to 3000 as described above.

Before the step of forming the resin layer, a step of forming an elastic layer on the outer surface of the substrate may be performed. The elastic layer is obtained by, for example, applying and curing a silicone rubber mixture on the outer surface of the substrate.

The formation of the resin layer containing the crosslinked urethane resin is not particularly limited, but a coating and molding method of liquid paint is preferable. For example, it is preferable that individual materials for the resin layer are dispersed and mixed together in a solvent as the urethane raw material mixture and made into a paint and the paint is applied onto the conductive substrate, and dried and solidified or heated and cured.

As the solvent, a polar solvent is preferable from the viewpoint of the compatibility with a polyol or an isocyanate compound, which is a raw material of the crosslinked urethane resin.

Examples of the polar solvent include alcohols such as methanol, ethanol, and n-propanol; ketones such as acetone, methyl ethyl ketone, and methyl isobutyl ketone; esters such as methyl acetate and ethyl acetate; and the like. Among these, one solvent having favorable compatibility with the other materials can be used or two or more thereof can be mixed together and used.

In addition, a solid content at the time of making the urethane raw material into the paint can be freely adjusted with the amount of the solvent mixed and is preferably from 20 mass % to 40 mass % from the viewpoint of uniformly dispersing an electron conductive substance, such as carbon black, which will be described below. For the dispersion and mixing, a well-known dispersion device in which beads are used, such as a sand mill, a paint shaker, a dyno mill, or a pearl mill, can be used. In addition, as a coating method, immersion coating, ring coating, spray coating, or roll coating can be used.

For example, the polyol, the isocyanate-based compound, the conductive filler, the surface modifier, the additive, which are the raw materials of the binder resin, and the like are mixed together to obtain a liquid-form paint. After that, the resin layer paint is applied onto the above-described substrate. After that, the resin layer paint is dried and solidified or heated and cured, thereby forming a crosslinked urethane resin. At this time, the weight-average molecular weight of the surface modifier is set to 200 to 3000, which makes it easy to orient the surface modifier in the vicinity of the surface without causing the surface modifier to ooze onto the surface. The surface modifier at this time is present in an unreacted state in the vicinity of the surface in the crosslinked urethane resin.

Next, the resin layer formed as described above is impregnated with a liquid-form (meth)acrylic monomer. The resin layer can be impregnated with the liquid-form (meth)acrylic monomer as it is or with an impregnation treatment liquid obtained by appropriately diluting the liquid-form (meth) acrylic monomer with a variety of solvents. The resin layer obtains a more uniform surface composition when the liquid-form (meth)acrylic monomer is appropriately diluted with the variety of solvents.

As the solvent, any solvent can be freely selected as long as the solvent satisfies both affinity to the resin layer and solubility of the (meth)acrylic monomer. Examples thereof include alcohols such as methanol, ethanol, and n-propanol; ketones such as acetone, methyl ethyl ketone, and methyl isobutyl ketone; esters such as methyl acetate and ethyl acetate; and the like.

In addition, a polymerization initiator is appropriately mixed with the impregnation treatment liquid. The details of the polymerization initiator are as described above. A method for impregnating with the impregnation treatment liquid is not particularly limited, and immersion coating, ring coating, spray coating, or roll coating can be used. After the immersion treatment, the time for air drying is preferably set to 15 minutes or shorter to prevent the surface modifier added to the resin layer from oozing onto the surface due to the solvent in the impregnation treatment liquid. After that, the impregnation treatment liquid is dried at 90° C. for one hour to volatilize the solvent.

After the impregnation treatment is performed with the impregnation treatment liquid as described above, the (meth)acrylate monomer or oligomer added as the surface modifier to the resin layer and the (meth)acrylic monomer from the impregnation treatment are polymerized and cured at the same time. When a reaction progresses, the (meth) acrylate monomer or oligomer added to the resin layer is bulky and thus cures while being oriented toward the outermost surface. Due to such a step, it is likely that the groups derived from the surface modifier, such as the silicone groups and/or the fluorine groups, are intertwined with each other in a state of being orientated on the outermost surface to form an IPN structure in the vicinity of the surface of the network structure of the crosslinked urethane resin. A method for the polymerization and curing is not particularly limited, and a well-known method can be used. Specific examples thereof include methods such as thermal curing and ultraviolet irradiation.

Process Cartridge and Electrophotographic Image-forming Device

A process cartridge is configured to be detachable from a main body of an electrophotographic image forming apparatus. The process cartridge is preferably equipped with an electrophotographic roller, a toner layer thickness-regulating member that comes into contact with the electrophotographic roller, regulates the layer thickness of a toner that is carried on the electrophotographic roller, and is at least partially conductive, and a contact point electrically connected to the toner layer thickness-regulating member.

This contact point is electrically connected to a main body contact point of the main body of the electrophotographic image forming apparatus and enables a predetermined voltage to be applied to the toner layer thickness-regulating member when the process cartridge has been mounted in the main body of the electrophotographic image forming apparatus.

The electrophotographic roller according to the present disclosure can be suitably used as a developing roller, a toner supply roller, and a developing sleeve in the process cartridge. The electrophotographic roller is, for example, a developing roller that supplies a toner to an electrostatic latent image that is formed on a photosensitive member. The process cartridge may have a toner, a developing roller, a toner layer thickness-regulating member that comes into contact with the developing roller, regulates the layer thickness of a toner that is carried on the developing roller, and is at least partially conductive, and a contact point electrically connected to the toner layer thickness-regulating member. In addition, at least a part of the toner layer thickness-regulating member is conductive.

Figure 3:
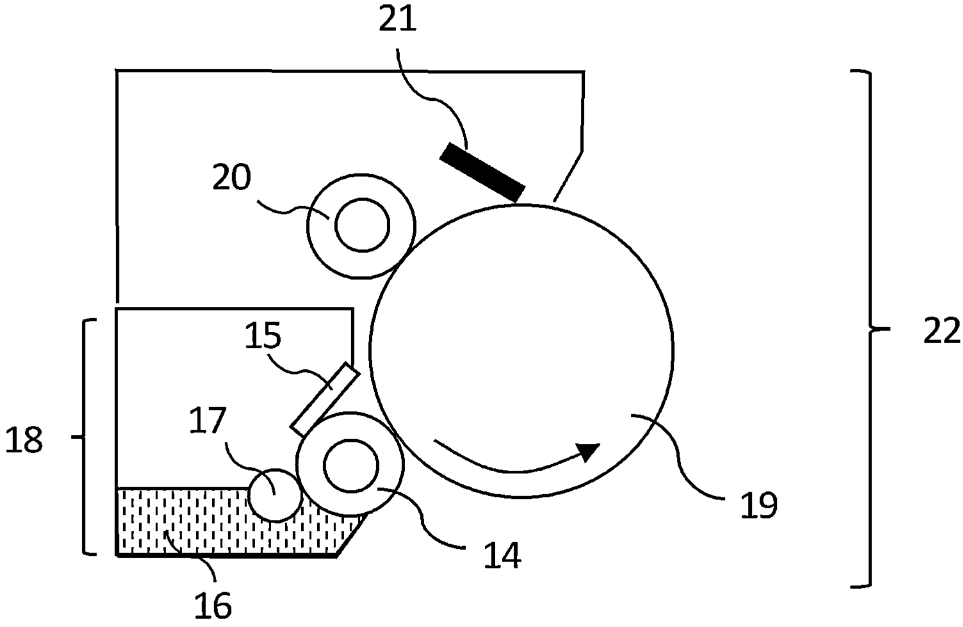
FIG. 3 is a schematic view of a process cartridge.

FIG. 3 is a schematic cross-sectional view of one example of a process cartridge according to one aspect of the present disclosure. In FIG. 3, the electrophotographic roller is installed as a developing roller 14. A process cartridge 22 is configured to be attachable to and detachable from the main body of the electrophotographic image forming apparatus. The process cartridge 22 is formed by uniting a developing apparatus 18 provided with the developing roller 14 and a developing blade 15, a photosensitive member 19, a charging roller 20, and a cleaning blade 21. Further, the developing apparatus 18 is filled with a toner 16. The toner 16 is supplied to the surface of the developing roller 14 by the toner supply roller 17, and the layer of the toner 16 having a predetermined thickness is formed over the surface of the developing roller 14 by the developing blade 15.

The developing roller 14 is in contact with the photosensitive member 19, and is rotationally driven with respect to the photosensitive member 19 at a predetermined peripheral velocity ratio. A predetermined bias is applied to the developing roller 14, and an electrostatic latent image on the photosensitive member 19 is developed and visualized using the toner 16.

The toner supply roller 17 is in contact with the developing roller 14, penetrates at a predetermined penetration level to rotate in the same direction as the rotation direction of the developing roller 14. A bias of the same electric potential as the bias applied to the developing roller 14 is applied to the toner supply roller 17.

The toner layer thickness-regulating member that is at least partially conductive is, for example, the developing blade 15. The developing blade 15 is fixed to the developing apparatus 18 at one end and is disposed to come into contact with the developing roller 14 in a direction opposite to the rotation direction of the developing roller 14 at the other free end. The developing blade 15 being disposed to come into contact with the developing roller 14 regulates the amount of the toner on the developing roller 14, makes a layer thin, and forms a toner layer in a uniform thickness. In addition, the process cartridge is equipped with a contact point (not shown) electrically connected to the toner layer thickness-regulating member. This contact point makes it possible to electrically connect the process cartridge to the main body contact point of the main body of the electrophotographic image forming apparatus and makes it possible to apply a predetermined voltage to the developing blade 15. A predetermined vias is applied to the developing blade 15, and charges are imparted to the toner 16.

The electrophotographic image forming apparatus has a photosensitive member and an electrophotographic roller that supplies a toner to an electrostatic latent image that is formed on the photosensitive member. In addition, the electrophotographic roller is preferably the above-described electrophotographic roller. In addition, the electrophotographic image forming apparatus preferably has a photosensitive member, a toner, and a developing roller that supplies the toner to an electrostatic latent image that is formed on the photosensitive member. In addition, the developing roller is preferably the above-described electrophotographic roller.

Figure 4:
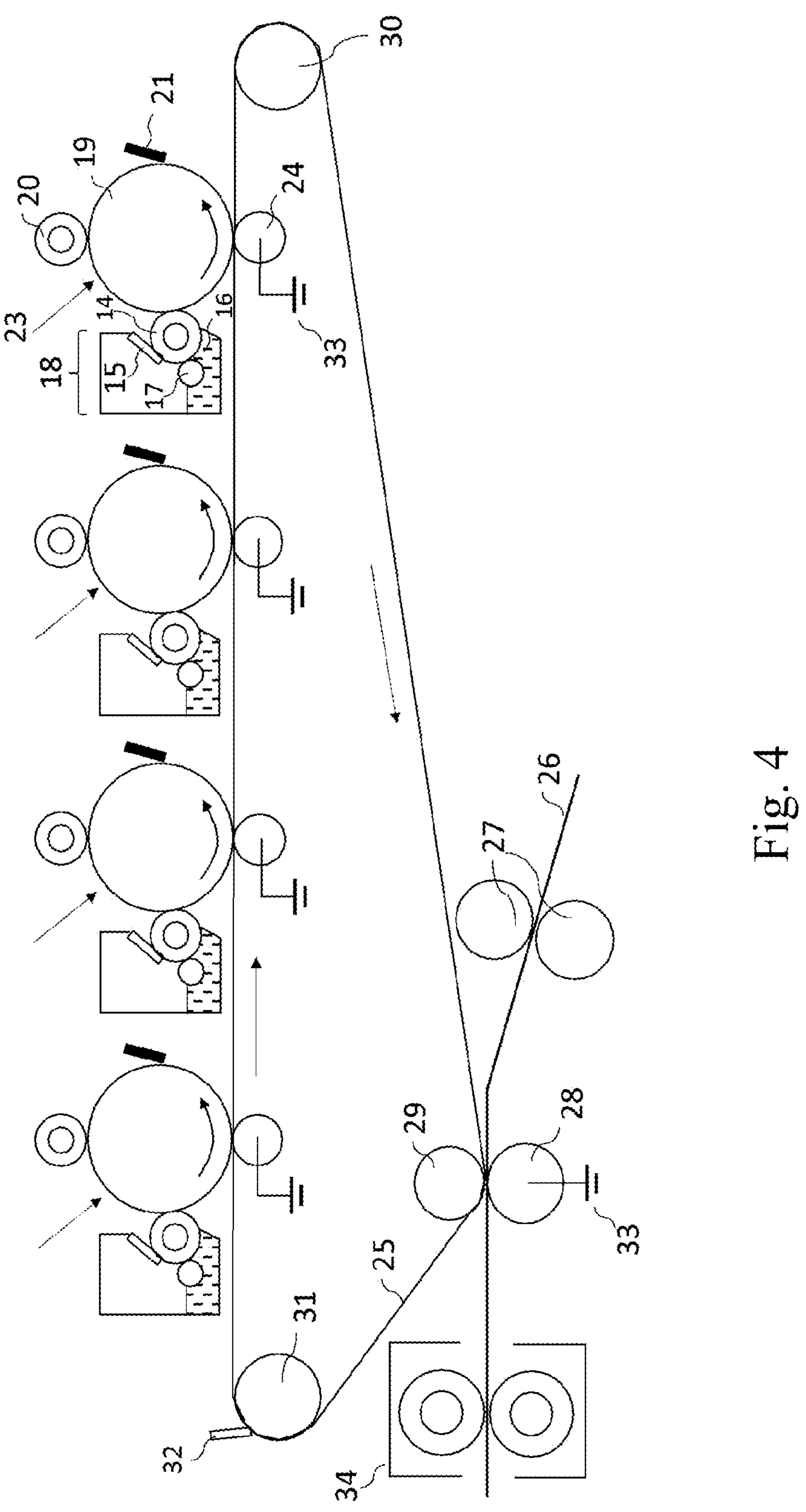
FIG. 4 is a schematic view of an electrophotographic image forming apparatus.

FIG. 4 is a schematic cross-sectional view showing one example of the electrophotographic image forming apparatus into which the electrophotographic rollers are installed as developing rollers for a contact-type developing apparatus using a one-component toner. Each of the developing apparatuses 18 comprises the toner 16 as a one-component toner, the developing roller 14, the toner supply roller 17 to supply the toner to the developing roller 14, and the developing blade 15 to regulate the thickness of the toner layer over the developing roller 14. The developing roller 14 is positioned at an opening part that is present as extending in the longitudinal direction in the developing apparatus 18, and is placed to be in contact with the photosensitive member 19. The main body of the electrophotographic image forming apparatus may be equipped with the photosensitive member 19, the charging roller 20, and the cleaning blade 21. The colored toners of black, cyan, magenta, and yellow are prepared in the developing apparatuses 18, respectively, which enables color printing.

Hereinafter the printing operation of the electrophotographic image forming apparatus will be described. Each of the photosensitive members 19 rotates in the direction indicated by the arrow, and is uniformly charged by the charging roller 20 for charging the photosensitive member 19. Next, an electrostatic latent image is formed on the surface of the photosensitive member 19 by a laser light 23 that is an exposure measure. The toner 16 is applied to the electrostatic latent image by the developing apparatus 18 from the developing roller 14 arranged to be in contact with the photosensitive member 19; thereby, the electrostatic latent image is visualized (developed) as a toner image. This development is so-called reversal development such that a toner image is formed on an exposure part.

The toner image formed on the photosensitive members 19 is transferred onto an endless belt-shaped intermediate transfer member 25 by transfer rollers 24 that are transfer members.

Paper 26 that is a recording medium is fed into the apparatus by sheet-feeding rollers 27 and a secondary transfer roller 28, and is conveyed to a nip portion between the secondary transfer roller 28 and a driven roller 29 together with the intermediate transfer member 25 having the toner image, and the toner image is transferred on the paper 26. The intermediate transfer member 25 is operated by the driven roller 29, a driver roller 30, and a tension roller 31. The toner remaining on the intermediate transfer member 25 is cleaned by a cleaning device 32.

A voltage is applied from bias power sources 33 to the developing rollers 14, the developing blades 15, the transfer rollers 24, and the secondary transfer roller 28. The paper 26 onto which the toner image is transferred is subjected to a fixing treatment by a fixing apparatus 34, and discharged to the outside of the apparatus, and the printing operation is completed. Meanwhile, transfer residual toners remaining on the photosensitive members 19 without being transferred are scraped off by the cleaning blades 21 that are cleaning members for cleaning the surfaces of the photosensitive members. The cleaned photosensitive members 19 repeatedly perform the foregoing printing operation.

Volume Resistivity

Figure 5:
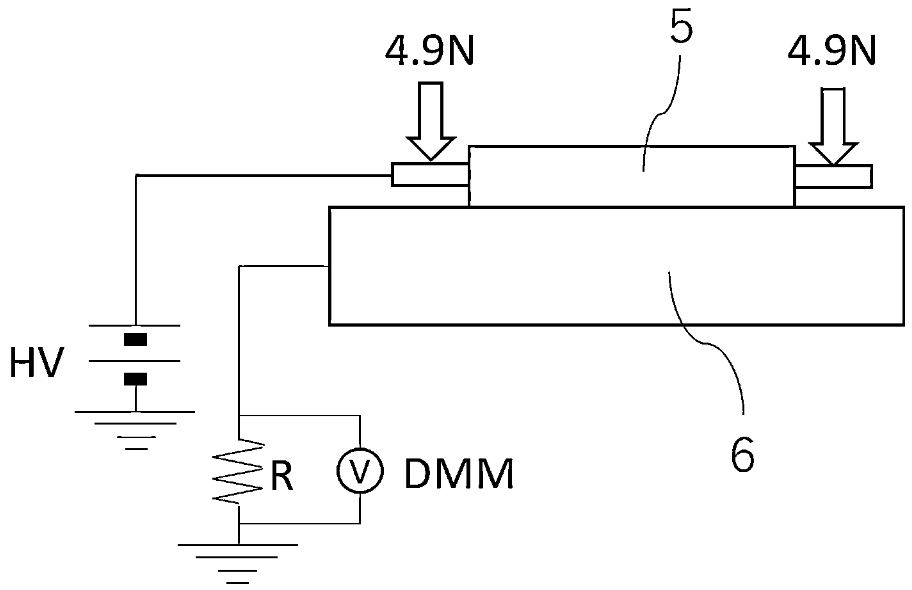
FIG. 5 is a schematic view showing an example of a device for measuring the electrical resistance of the electrophotographic roller.

The volume resistivity when a metal film is directly provided on the outer surface of the electrophotographic roller and a direct voltage of 50 V is applied thereto under an environment of a temperature of 23° C. and a relative humidity of 50% can be measured using an electrical resistance measuring instrument shown in FIG. 5.

A load of 4.9 N is applied to each of both ends of the axial core body of an electrophotographic roller 5 to install the electrophotographic roller to be in contact with a metal drum 6 having a diameter of 50 mm. The metal drum 6 is rotated at a surface rate of 50 mm/sec, and the electrophotographic roller 5 is driven to rotate. A resistor R having a known electrical resistance that is lower than the electrical resistance of the electrophotographic roller 5 by two orders of magnitude or more is connected between the metal drum 6 and the ground. A voltage of +50 V is applied to the axial core body of the electrophotographic roller 5 from a high-voltage power supply HV, and the potential difference between both ends of the resistor R is measured using a digital multimeter DMM (189 TRUE RMS MULTIMETER manufactured by Fluke Corporation).

A current that has flowed into the metal drum 6 through the electrophotographic roller 5 is obtained by calculation from the measured value of the potential difference and the electrical resistance of the resistor R, and the electrical resistance value of the electrophotographic roller 5 is obtained by calculation from the current and the applied voltage of 50 V. In the measurement with the digital multimeter, sampling is performed for three seconds after two seconds from the application of the voltage, and a value that is calculated from the average value thereof is regarded as the resistance value of the electrophotographic roller. Subsequently, the area of the contact part between the electrophotographic roller 5 and the metal drum 6 is calculated. The volume resistivity of the electrophotographic roller is obtained from the resistance value of the electrophotographic roller, the area of the contact part, and the thickness of rubber of the electrophotographic roller.

Specifically, the volume resistivity can be calculated by the following equation.

$$\text{Volume resistivity } \rho_v = R \times \frac{S}{L}$$

R: the resistance value, S: the area of the contact part, L: the thickness of the rubber of the electrophotographic roller The meaning of the measured value is as described in the above-described Technical Meaning of Requirement (1).

Surface Potential

A method for measuring the surface potential will be described. The surface potential is measured using a charge amount measuring instrument (trade name: DRA-2000L, manufactured by Quality Engineering Associates (QEA), Inc.). Specifically, a corona discharger having a 3.0 mm-wide grid part is disposed under an environment of a temperature of 23° C. and a relative humidity of 50% such that the distance between the grid part and the outer surface of the electrophotographic roller reaches 1.0 mm and the width direction of the grid part and the axial direction of the electrophotographic roller coincide with each other. Subsequently, a voltage of 8 kV is applied to the grid part, the corona discharger is relatively moved along the axial direction of the electrophotographic roller at a rate of 400 mm/second to charge the outer surface of the electrophotographic roller. At this time, the potentials of the outer surface after 0.06 seconds from the passage of the grid part are measured. This makes it possible to evaluate the degree of charge-up of the outer surface of the electrophotographic roller.

Figure 6:
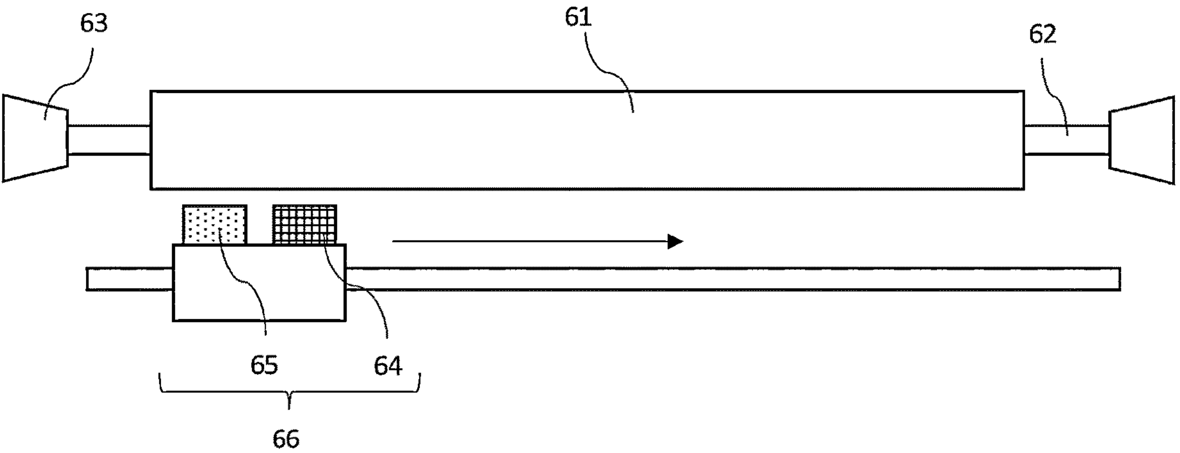
FIG. 6 is a schematic view showing an example of a device for measuring the surface potential of the electrophotographic roller.

The surface potential of the electrophotographic roller can be measured with, for example, a device shown in FIG. 6. Both end parts of a substrate 62 of an electrophotographic roller 61 are gripped with chucks 63, and a measurement unit 66 having a corona discharger 64 and a surface potential meter 65 disposed in parallel at an interval of 25 mm is disposed to face the surface of the electrophotographic roller 61 at a distance (interval) of 1.0 mm. A voltage of 8 kV is applied to a grid part of the corona discharger 64 in a state where the electrophotographic roller 61 has been made still, and the measurement unit 66 is moved in the axial direction of the electrophotographic roller 61 at a rate of 400 mm/second. At this time, the surface potential after 0.06 seconds from the passage of the corona discharger 64 is measured with the surface potential meter 65.

The meanings of the measurement conditions and the measured value are as described in the above-described Technical Meaning of Requirement (2).

Ionization Potential

The ionization potential is measured by the following measurement method. The ionization potential refers to energy (eV) for extracting an electron from a substance that is expressed in a numerical form. The ionization potential is measured using a surface analyzer (trade name: AC-5, manufactured by Riken Keiki Co., Ltd.). In the device, a heavy hydrogen lamp is used, and the ionization potential is measured under the following conditions.

Irradiation amount: 800 nW

Spectrometer: Grating-type monochromator

Spot size: 2 [mm]×4 [mm]

Energy scanning range: 4.0 to 6.2 [eV]

Measurement time: 5 [sec/energy]

In addition, a photoelectron that is emitted from the sample surface is detected, and arithmetic processing is performed using ionization potential calculation software combined into the surface analyzer.

In the measurement, a 1 cm-wide rubber piece cut out from the electrophotographic roller along the core metal is used, and a measurement curve obtained from the average value of three times of sweeping is used in the arithmetic processing.

In the surface analysis, when the excitation energy of monochromatic light is scanned from low to high at intervals of 0.05 eV, the emission of a photon begins from a certain energy value [eV], and this energy threshold is regarded as the ionization potential [eV].

Figure 7:
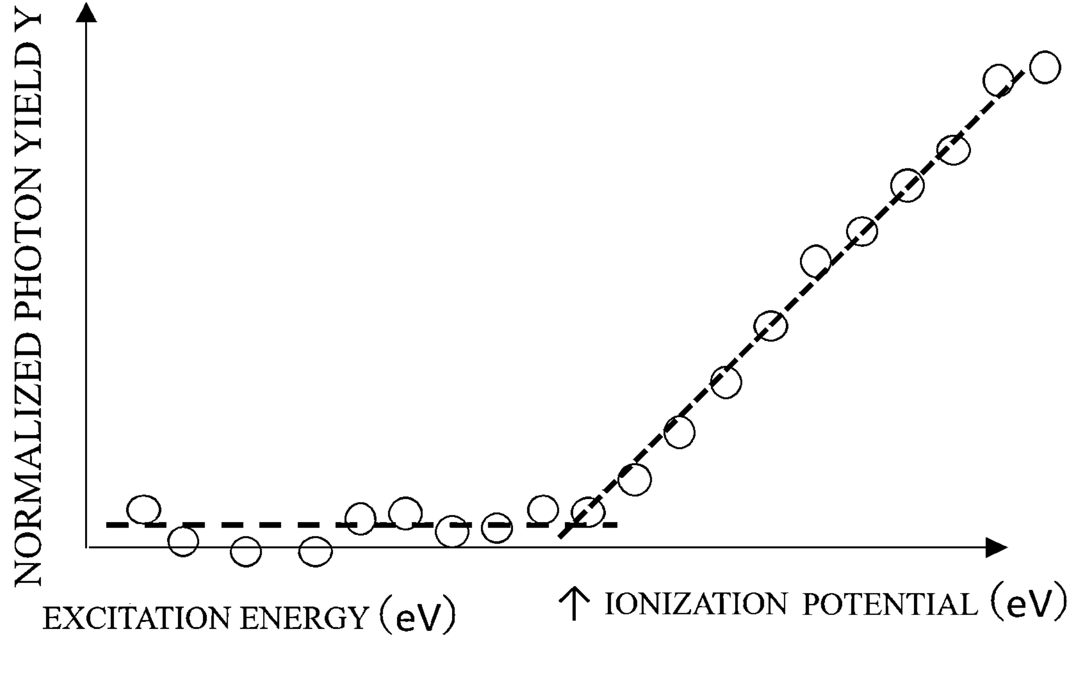
FIG. 7 is an example of a result that is obtained by ionization potential measurement.

One example of the measurement curve of a work function that is obtained by the measurement under the above-described conditions is shown in FIG. 7. In FIG. 7, the horizontal axis indicates the excitation energy [eV], and the vertical axis indicates the value of the number of emitted photoelectrons to the power of 0.5 (normalized photon yield) Y. Ordinarily, when the excitation energy value exceeds a certain threshold, photons are abruptly emitted. That is, the normalized photon yield becomes large. The value of an excitation energy necessary when this normalized photon yield begins to increase is defined as the ionization potential.

The meaning of the measured value is as described in the above-described Technical Meaning of Requirement (3).

Method for Measuring Elastic Modulus

The elastic modulus is measured with a scanning probe microscope (SPM).

First, a region including a thickness-direction cross section of the resin layer is cut into a flake and taken out of the electrophotographic roller in a state of being maintained at −110° C. using a cryo-microtome (trade name: EMFC6, manufactured by Leica Microsystems) and a diamond knife. Furthermore, a 100 μm×100 μm specimen that is 100 μm wide in the depth direction is produced from the flake.

Figure 8:
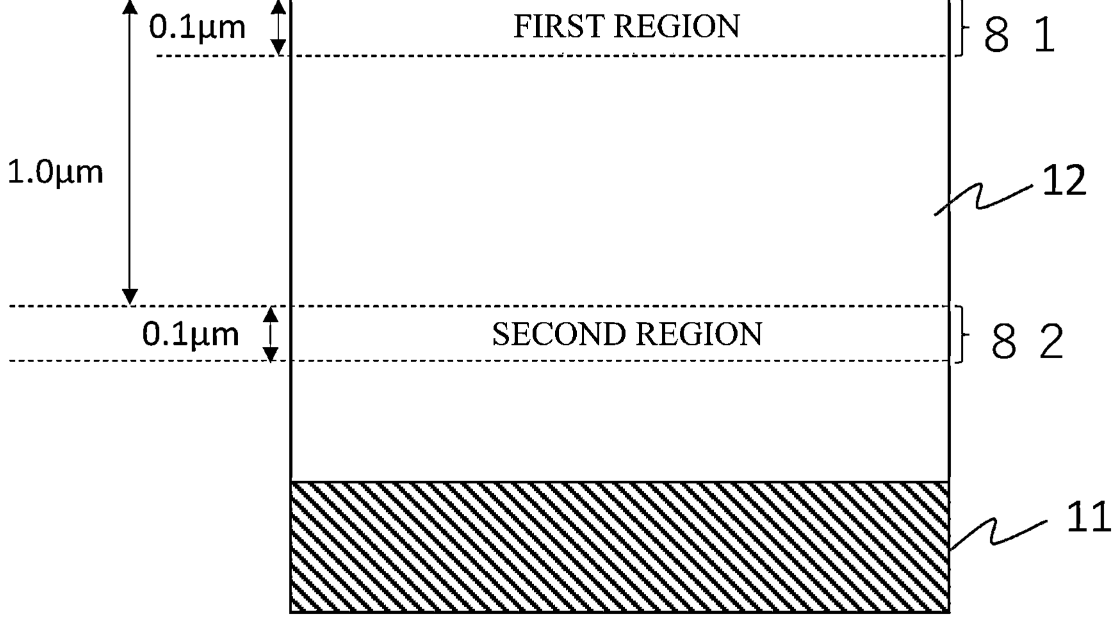
FIG. 8 is a cross-sectional view of an electrophotographic roller according to an invention.

Here, FIG. 8 shows a schematic cross-sectional view of the resin layer 12 formed on the conductive substrate 11. In the present disclosure, a region from the outer surface of the resin layer 12 to a depth of 0.1 μm that forms the outer surface of the electrophotographic roller is regulated as a first region 81, and a region that is 1.0 to 1.1 μm deep from the outer surface is regulated as a second region 82 as shown in FIG. 8.

In each of the regions appearing on the cross section of the produced specimen, the elastic modulus is measured. In the measurement, an SPM device (trade name: MFP-3D-Origin, manufactured by Oxford Instruments Holdings Inc.) and a probe (trade name: AC160, manufactured by Olympus Corporation) are used. First, a 5 μm×5 μm image is acquired, force curves are measured 10 times at each of the first region 81 and the second region 82 other than the roughness-forming particle and the carbon black, the arithmetic average of eight measured values excluding the maximum value and the minimum value is obtained, and the elastic modulus can be calculated with the Hertz theory. The elastic moduli in the first region 81 and the second region 82 are indicated by E1 and E2, respectively.

The meaning of E1 in the first region is as described in the above-described Technical Meaning of Requirement (3).

E2 in the second region is the elastic modulus at a depth of 1.0 to 1.1 μm from the outer surface. The elastic modulus E2 in the region that is 1.0 to 1.1 μm deep from the outer surface of the electrophotographic roller that is measured on the thickness-direction cross section of the resin layer of the electrophotographic roller is, for example, 1 to 150 MPa, preferably 1 to 100 MPa, and more preferably 5 to 50 MPa.

In a case where E2 in the second region is within the above-described range, a load on the toner from the electrophotographic roller is reduced, and filming can be suppressed. E1 and E2 are preferably satisfied at the same time. When E1 and E2 are satisfied at the same time, only the outermost surface has high hardness without increasing the load on the toner, and it is possible to narrow the contact area between the toner and the electrophotographic roller. As a method for increasing the elastic modulus E1, an IPN structure is preferably used. This structure is likely to achieve the requirements (2) and (4) at the same time. Furthermore, E1 can be selectively increased without increasing E2.

Examples of a method for increasing the hardness also include methods in which the crosslinking density of rubber that configures the surface of the electrophotographic roller is significantly increased; however, in such methods, the hardness increases even in the resin layer. Therefore, the load on the toner becomes high, and filming occurs in some cases. In addition, in the case of increasing the hardness by such a method, the flexibility is reduced, and the outer surface becomes brittle in some cases, and conversely, scratches may also be generated due to cutting. When the elastic modulus E2 at a depth of 1.0 to 1.1 μm from the outer surface is set to be within the above-described range, it is possible to suppress scratches and filming.

Verification of IPN Structure

The IPN structure is verified by microsampling mass spectrometry. In the microsampling mass spectrometry, an ion trap mass spectrometer is used. A specimen is fixed to a filament that is positioned at the front end of a probe and directly inserted into an ionization chamber. After that, the specimen is rapidly heated from room temperature to 1000° C. at a constant heating rate. The specimen decomposed and evaporated by the heating is ionized by irradiation with electron beams, and the IPN structure is detected with the mass spectrometer.

At this time, under the condition where the heating rate is constant, a thermal chromatogram that has a mass spectrum called total ion chromatogram (TIC) and is similar to a TG-MS (simultaneous thermogravimetric-mass analysis) method is obtained. In addition, it is also possible to obtain a thermal chromatogram with respect to a predetermined mass of a fragment, and it is thus possible to obtain the peak temperature of a thermal chromatogram that corresponds to the decomposition temperature of a desired molecular structure. The peak temperature of the thermal chromatogram correlates with the crosslinked structure in a structure of the resin, and the peak temperature further shifts toward high temperatures as the crosslink becomes denser. That is, the peak temperature of the thermal chromatogram becomes high for a portion where the crosslinked urethane resin and the crosslinked acrylic resin form the IPN structure compared with that for the crosslinked acrylic resin alone.

From a first specimen that is obtained from the first region, which is the region from the outer surface of the resin layer to a depth of 0.1 μm, a peak top temperature A1 of a thermal chromatogram derived from the crosslinked acrylic resin is obtained. Furthermore, a peak top temperature A2 of a thermal chromatogram derived from the crosslinked acrylic resin that is measured from a second specimen that is obtained by decomposing the crosslinked urethane resin in the first specimen is obtained. In a case where the IPN structure has been formed, regarding the peak temperatures of the thermal chromatograms, A1 becomes higher than A2.

A2 is a value obtained by performing the microsampling mass spectrometry on the second specimen that is obtained after the crosslinked urethane resin is decomposed by a pyridine decomposition method, which will be described below.

Examples of A1 include 393° C. to 398° C. and 394° C. to 397° C. Examples of A2 include 390° C. to 396° C. and 391° C. to 395° C.

Pyridine Decomposition Method

The pyridine decomposition method is a method by which an urethane bond is selectively decomposed. When the pyridine decomposition method is performed on a sample having an IPN structure by a crosslinked acrylic resin and a crosslinked urethane resin, it is possible to obtain a crosslinked acrylic resin from which a structure derived from the crosslinked urethane has been removed. The presence or absence of the IPN structure can be confirmed by perceiving a change in the peak temperature of the thermal chromatogram of this crosslinked acrylic resin. The pyridine decomposition method is, specifically, performed by the following method.

A 0.1 μm-thick sample is cut out from the outer surface of the resin layer of the electrophotographic roller using a microtome, and 500 mg of the sample is collected. 0.5 mL of a liquid mixture obtained by mixing pyridine (manufactured by FUJIFILM Wako Pure Chemical Corporation) and water in a ratio of 3:1 is added to the obtained sample, and the sample is heated at 130° C. for 15 hours in a fluororesin ("TEFLON" (registered trademark)) airtight container equipped with a stainless steel jacket and thereby decomposed. A decompression treatment is performed on the obtained decomposition product, thereby removing the pyridine. The above-described microsampling mass spectrometry is performed using the sample thus obtained, and the value of A2 is obtained.

Structural Analysis of Crosslinked Acrylic Resin

The silicone group and/or the fluorine group being contained in the crosslinked acrylic resin molecule can be analyzed by well-known means with pyrolysis GC/MS (gas chromatograph mass spectrometer), FT-IR (Fourier transform infrared spectrometer), NMR (nuclear magnetic resonance spectrometer), or the like.

In the present invention, the structure derived from crosslinked urethane was removed by the pyridine decomposition method, and the obtained crosslinked acrylic resin was confirmed using FT-IR (trade name: FT/IR-4700, manufactured by JASCO Corporation, FT-IR).

Measurement of Amount of Surface Element

A method for measuring the proportion Atomic % of the detection value of Si and the proportion Atomic % of the detection value of F (hereinafter, also referred to as Si/F amount) based on the total of the detection values of F, C, O, Si, and N when the outer surface of the resin layer of the electrophotographic roller is measured by electron spectroscopy for chemical analysis (ESCA) is as described below.

The Si/F amount is measured using electron spectroscopy for chemical analysis (ESCA). More specifically, this measurement can be performed under the following conditions using an electron spectroscope for chemical analysis (trade name: Quantum 2000 Scanning ESCA Microprobe, manufactured by Physical Electronics Industries, Inc.). In addition, a surface atom concentration (Atomic %) is calculated from the obtained peak intensity of each element using a relative sensitivity factor provided by Physical Electronics Industries, Inc. and is regarded as the presence proportion of the Si/F amount relative to the configuration elements in the outermost surface of the resin layer.

In the present disclosure, at least one of the proportion of the detection value of Si and the proportion of the detection value of F based on the total of the detection values of F, C, O, Si, and N is preferably 5.0 to 15.0 Atomic % and more preferably 5.0 to 13.0 Atomic %. Both the proportion of the detection value of Si and the proportion of the detection value of F may be within the above-described range. In addition, it is preferable that both the proportion of the detection value of Si and the proportion of the detection value of F do not exceed 15.0 Atomic %.

In a case where the presence proportion of the Si/F amount is within the above-described range, the surface modifier has been oriented in the vicinity of the surface without oozing from the surface of the resin layer, and it is thus easy to make the ionization potential be 5.0 eV or higher without increasing the surface potential. In a case where the presence proportion of the Si/F amount is 5.0 Atomic % or less, it is difficult to make the ionization potential of the outermost surface be 5.0 eV or higher. In addition, in a case where the presence proportion of the Si/F amount is 15.0 Atomic % or less, the number of high-resistance portions on the outermost surface becomes small, and it is easy to suppress the surface potential.

The measurement is performed under the following conditions.

Excitation X ray: A1 Kα

Photoelectron escape angle: 45°

X ray: 100 μm 25 W 15 kV

Electronic neutralization gun: 20 μA, 1 V

Ionic neutralization gun: 7 mA, 10 V

Analysis region: 300 μm×200 μm

Pass energy: 58.70 e V

Step size: 0.125 eV

Sweep: F (10 times), C (10 times), O (10 times), Si (30 times), N (30 times)

Measurement of Weight-average Molecular Weight

The weight-average molecular weight Mw of the surface modifier is preferably 200 to 3000. The meaning of the measured value is as described above. A device and conditions that are used for the measurement of the weight-average molecular weight are as described below.

Measurement equipment: HLC-8120GPC (trade name: manufactured by Tosoh Corporation);

Columns: Two TSKgel Super HZMM (trade name: manufactured by Tosoh Corporation);

Solvent: THF;

Temperature: 40° C.;

Flow rate of THF: 0.6 ml/min.

As a measurement sample, a 0.1 mass % THE solution was used. Furthermore, the measurement was performed using RI (refractive index) detector as a detector. A calibration curve was created using TSK standard polystyrenes (trade names, A-1000, A-2500, A-5000, F-1, F-2, F-4, F-10, F-20, F-40, F-80, and F-128: manufactured by Tosoh Corporation) as standard specimens for creating the calibration curve. The weight-average molecular weight was obtained from the retention times of the measurement samples obtained on the basis of these.

EXAMPLES

Hereinafter, the present disclosure will be described in more detail with examples, but these do not limit the present disclosure by any means.

Example 1

1. Production of Conductive Substrate

A primer (trade name: DY35-051, manufactured by Dow Corning Toray Co., Ltd.) was applied to an SUS304 metal core having an outer diameter of 6 mm and a length of 270 mm and heated at a temperature of 150° C. for 20 minutes. This core metal was concentrically installed in a cylindrical mold having an inner diameter of 12.0 mm as a substrate.

An addition curing-type liquid-form silicone rubber mixture obtained by mixing materials shown in Table 1 below with a kneading machine (trade name: TRIMIX TX-15, manufactured by Inoue MFG., Inc.) was poured as a material for an elastic layer that was to serve as an intermediate layer into the mold heated to a temperature of 115° C. After the pouring, the material was heated and molded at a temperature of 120° C. for 10 minutes, cooled to room temperature, and then released from the mold, thereby obtaining an elastic roller having a 3.0 mm-thick elastic layer formed on the outer circumference of the substrate.

TABLE 1

| Materials | Parts by mass |
|---|---|
| Liquid-form dimethylpolysiloxane having two or more silicon atom-bonded alkenyl groups in one molecule (trade name: SF3000E, viscosity 10000 cP, vinyl group equivalent 0.05 mmol, manufactured by KCC Corporation) | 100 |
| Platinum-based catalyst (trade name: SIP6832.2, manufactured by Gelest Inc.) | 0.048 |
| Dimethylpolysiloxane having two or more silicon atom-bonded hydrogen atoms in one molecule (trade name: SP6000P, Si—H group equivalent 15.5 mmol/g, manufactured by KCC Corporation) | 0.5 |

TABLE 1-continued

| Materials | Parts by mass |
|---|---|
| Carbon black (trade name: TOKABLACK#7360SB, manufactured by Tokai Carbon Co., Ltd.) | 6 |

2. Formation of Resin Layer

As materials for a resin layer, materials other than roughness-forming particle in Table 2 below were stirred and mixed together. After that, the materials were dissolved in methyl ethyl ketone (manufactured by Kishida Chemical Co., Ltd.) so that the solid content concentration reached 30 mass %, mixed together, and uniformly dispersed with a sand mill. Methyl ethyl ketone was added to this mixed liquid so that the solid content concentration was adjusted to 25.0 mass %, a material shown in the row of roughness-forming particles in Table 2 was added thereto, and the materials were stirred and dispersed with a ball mill, thereby obtaining a paint for a resin layer 1.

The elastic roller was immersed in and coated with this paint, whereby the paint was applied thereto so that the film thickness of a resin layer reached 15 μm. After that, the resin layer was heated at a temperature of 135° C. for 60 minutes to dry and cure the coated film, thereby forming a crosslinked urethane resin in the resin layer.

TABLE 2

| Materials | Parts by mass |
|---|---|
| Polyether polyol (trade name: PTGL1000, manufactured by Hodogaya Chemical Co., Ltd.) | 100 |
| Polymeric MDI (trade name: MR-400, manufactured by Tosoh Corporation) | 36.0 |
| Carbon black (trade name: SUNBLACK X15, manufactured by Asahi Carbon Co., Ltd.) | 29.3 |
| Polyether monool (trade name: NEWPOL 50HB-100, manufactured by Sanyo Chemical Industries, Ltd.) | 3.0 |
| Roughness-forming particle (trade name: DYNAMIC BEADS UCN-5090, manufactured by Dainichiseika Color & Chemicals Mfg. Co., Ltd.) | 17.6 |
| Silicone hexacrylate (trade name: EBECRYL1360, manufactured by Daicel-Allnex Ltd.) | 4.9 |

Subsequently, an impregnation and curing treatment of an acrylic monomer capable of forming a crosslinked acrylic resin was performed by the following method. As materials for an impregnation treatment liquid for the impregnation treatment, materials shown in Table 3 below were dissolved and mixed together. The elastic roller on which the crosslinked urethane resin had been formed was immersed in this immersion treatment liquid for two seconds and treated, thereby impregnating the elastic roller with the acrylic monomer component. After that, the elastic roller was immediately dried at 90° C. for one hour to volatilize the solvent. The dried elastic roller was rotated and irradiated with ultraviolet rays such that the accumulated light amount reached 15000 mJ/cm$^2$, whereby the acrylic monomer was cured, an IPN structure was formed, and a resin layer was obtained.

As an ultraviolet irradiation device, a high-pressure mercury lamp (trade name: handy UV curing device, manufactured by Marion Network) was used.

TABLE 3

| Materials | Parts by mass |
|---|---|
| Acrylic monomer (trade name: EBECRYL145, manufactured by Daicel-Allnex Ltd.) | 5.0 |
| Photopolymerization initiator (trade name: IRGACURE184, manufactured by BASF) | 0.25 |
| Solvent (methyl ethyl ketone, manufactured by Kishida Chemical Co., Ltd.) | 100 |

On the obtained electrophotographic roller, the following evaluations were performed.

3. Image Evaluation

The image evaluation method will be described below.

Figure 9:
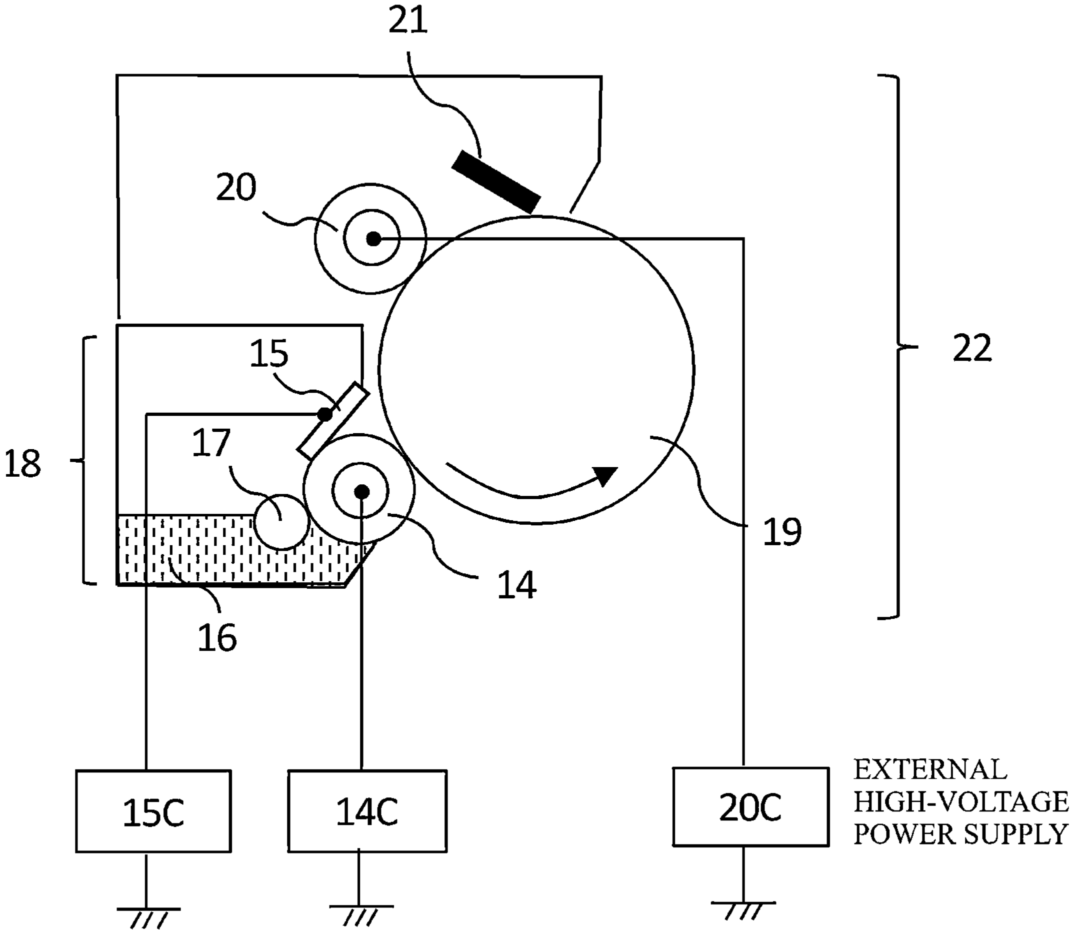
FIG. 9 is a schematic view of an electrophotographic image forming apparatus for image evaluation.

LBP-7600C (manufactured by Canon Inc.), which was a commercially available laser printer, was converted and used as the electrophotographic image forming apparatus. FIG. 9 shows the structure of the converted apparatus. The following were the points of the conversion: the apparatus could connect to an external high-voltage power source 20C in addition to power sources 14C and 15C so as to give a discretionary electric potential difference between the developing blade and the electrophotographic roller; and for the evaluation in high-speed processing, the number of prints outputted per unit time was set to be 50 prints/min when an A4 sheets were used.

A commercially available black toner cartridge (manufactured by Canon Inc.) was used as the process cartridge, and the developing roller was exchanged for the electrophotographic roller of Example 1. At this time, the filling amount was adjusted so that the toner was 100 g. Yellow, cyan and magenta cartridges for which a toner remaining amount detection mechanism was ineffective were inserted into stations for yellow, cyan, and magenta, respectively, from which product toners had been removed. Then, the evaluation was performed.

Fogging Evaluation

The prepared process cartridge was installed in the main body of the electrophotographic image forming apparatus, and allowed to stand under the environment of 30° C. in temperature, and 80% in relative humidity for 24 hours. Thereafter, the electric potential difference between the developing blade and the electrophotographic roller was set in −300 V by the use of the external high-voltage power source. Under the same conditions, the following images were continuously outputted on A4 sheets of paper for evaluation (GF-C081 manufactured by Canon Inc.): the print percentage of the alphabetical letters "E" each having 4 points in size was 2% to the area of each of the A4 sheets of paper. A solid white image was outputted every time when 1000 prints were outputted. This was repeated until the number of the outputted prints reached 20000, and the fogging values were measured by the following method.

Using a reflection densitometer (trade name: TC-6DS/A, manufactured by Tokyo Denshoku CO., LTD.), the reflection density R1 of the recording member before the image formation, and the reflection density R2 of the recording member after each of the solid white images was outputted were measured, and the increase of the reflection density (R2-R1) was defined as the "fogging value" of the electrophotographic roller. The reflection densities were measured over the entire image printing areas of the recording members: the arithmetic mean value was used for the recording member before the image formation; and the maximum value was used for the recording member after the solid white image was outputted. Next, the arithmetic mean value of the fogging values of respective images in 20000 prints was calculated. The smaller the fogging value was, the better. Usually, toner is not transferred onto transfer paper where a solid white image is formed. When the charge quantity of toner does not suffice, the toner moves onto a photosensitive member even when a solid white image is formed, and further, is also transferred onto transfer paper, which causes a fogging value to be larger. The evaluation results are shown in Tables 6-1 and 6-2.

Fogging seems to tend to easily occur under a high-temperature high-humidity environment of 30° C. in temperature, and 80% in relative humidity. Then, the evaluation was carried out under the high-temperature high-humidity environment.

Evaluation of Image Density Stability

The prepared process cartridge was installed in the main body of the electrophotographic image forming apparatus, and allowed to stand under the environment of 15° C. in temperature, and 10% in relative humidity for 24 hours. Thereafter, the electric potential difference between the developing blade and the electrophotographic roller was set in −300 V by the use of the external high-voltage power source, and one print of a 25% halftone image to solid black, 48 prints of solid white images, and one print of a 25% halftone image to solid black were continuously outputted in this order. The densities of the obtained first and fiftieth prints of the halftone images were measured using a spectrodensitometer (trade name: 508, manufactured by X-Rite, Inc.), and the density difference between the first and fiftieth prints was obtained. The smaller the density difference was, the better. The evaluation results are shown in Tables 6-1 and 6-2.

Examples 2 to 25 and Comparative Examples 1 to 5

By the same methods as in Example 1, paints for a resin layer were prepared, respectively, with materials shown in Tables 4-1 and 4-2, impregnation treatment liquids were prepared, respectively, with materials shown in Table 5, and furthermore, electrophotographic rollers were produced, respectively, in combinations shown in Tables 6-1 and 6-2. On the obtained electrophotographic rollers, the respective evaluations were performed by the same methods as in Example 1. The evaluation results are shown in Tables 6-1 and 6-2.

Comparative Example 6

A surface modifier A described in the examples of Japanese Patent No. 6510936 was used as a material for a paint for a resin layer, the paint for a resin layer was prepared with materials shown in Tables 4-1 and 4-2, and an electrophotographic roller was produced in combinations shown in Tables 6-1 and 6-2.

The surface modifier A was produced as described below. 3.08 g (0.67 mmol) of acrylate-modified silicone oil (manufactured by Shin-Etsu Chemical Co., Ltd., "X-22-174DX"), 8.53 g (19.73 mmol) of 2-(perfluorohexyl)ethyl acrylate (manufactured by Daikin Industries, Ltd., "R-1620"), 13.08 g (68.03 mmol) of 2-phenoxyethyl acrylate (manufactured by TOMOE Engineering Co., Ltd., "SR339A"), 1.51 g (11.57 mmol) of 2-hydroxyethyl methacrylate (manufactured by Tokyo Chemical Industry Co., Ltd.), 1.24 g (4 mmol) of dimethyl 1,1'-azobis (1-cyclohexanecarboxylate) (manufactured by FUJIFILM Wako Pure Chemical Corporation, "VE-73"), and 22.44 g of methyl ethyl ketone (MEK) were charged into a 100 mL reaction flask, and bubbled with nitrogen for five minutes while being stirred.

After that, polymerization was performed at an internal liquid temperature of 80° C. for seven hours, thereby generating a copolymer. Subsequently, 41.56 g of methyl ethyl ketone (MEK) was added thereto, thereby obtaining the surface modifier A having a solid content of 30%. This was used as a surface modifier. By the same methods as in Example 1 except for what has been described above, a paint for a resin layer and an impregnation treatment liquid were prepared with materials shown in Tables 4-1 and 4-2 and Table 5, and furthermore, an electrophotographic roller was produced in combinations shown in Tables 6-1 and 6-2. On the obtained electrophotographic roller, the evaluations were performed by the same methods as in Example 1. The evaluation results are shown in Tables 6-1 and 6-2.

Comparative Examples 7 to 9

A synthetic liquid containing a photopolymerizable polymer A described in the examples of Japanese Patent No. 5968257 was used as an impregnation treatment liquid.

Specifically, 1.66 g (0.36 mmol) of acrylate-modified silicone oil (manufactured by Shin-Etsu Chemical Co., Ltd., "X-22-174DX"), 5.61 g (13 mmol) of 2-(perfluorohexyl) ethyl acrylate (manufactured by Daikin Industries, Ltd., "R-1620"), 1.69 g (13 mmol) of 2-hydroxyethyl methacrylate (manufactured by Tokyo Chemical Industry Co., Ltd.), 7.37 g (73.64 mmol) of methyl methacrylate (manufactured by Junsei Chemical Co., Ltd.), 1.24 g (4 mmol) of dimethyl 1,1'-azobis (1-cyclohexanecarboxylate) (manufactured by FUJIFILM Wako Pure Chemical Corporation, "VE-73"), and 75 g of methyl ethyl ketone (MEK) were charged into a 100 mL reaction flask, bubbled with nitrogen for five minutes while being stirred, and then polymerized at an internal liquid temperature of 75° C. for seven hours, thereby generating a copolymer. After that, 2.02 g (13 mmol) of 2-isocyanatoethyl methacrylate (manufactured by Showa Denko K.K., "KARENZ MOI") and 0.001 g of bismuth tris (2-ethylhexanoate) (manufactured by FUJIFILM Wako Pure Chemical Corporation) were added to this reaction flask and stirred at an internal liquid temperature of 75° C. for 10 hours.

A hydroxyl group in a polymerization unit based on the 2-hydroxyethyl methacrylate and an isocyanate group in the 2-isocyanatoethyl methacrylate in the copolymer were reacted together, obtaining a solution containing a photopolymerizable polymer A. This was used as a material for an impregnation treatment liquid. By the same methods as in Example 1 except for what has been described above, paints for a resin layer and the impregnation treatment liquids were prepared with materials shown in Tables 4-1 and 4-2 and Table 5, and furthermore, electrophotographic rollers were produced in combinations shown in Tables 6-1 and 6-2. On the obtained electrophotographic rollers, the evaluations were performed by the same methods as in Example 1. The evaluation results are shown in Tables 6-1 and 6-2.

Comparative Example 10

An ultraviolet curable resin described in the examples of Japanese Patent Application Publication No. 2008-165214 was used as a paint for a resin layer.

Specifically, 60 parts by mass of an urethane acrylate oligomer (manufactured by The Nippon Synthetic Chemical Industry Co., Ltd., "UV3200B"), 20 parts by mass of a polar group-containing acrylate monomer (manufactured by Shin-Nakamura Chemical Co., Ltd., "AMO"), 20 parts by mass of a bulky substituent-containing acrylate monomer (manufactured by Kyoeisha Chemical Co., Ltd., "IBXA"), 5 parts by mass of 2-butyl-2-ethyl-1,3-propanediol diacrylate (manufactured by Kyoeisha Chemical Co., Ltd., "BEPG-A"), 17.6 parts by mass of crosslinked urethane resin particle ("DYNAMIC BEADS UCN-5090" manufactured by Dainichiseika Color & Chemicals Mfg. Co., Ltd.), 5 parts by mass of silicone acrylate (manufactured by Shin-Etsu Silicones of America, Inc., "X-22-2458"), 1 part by mass of a photopolymerization initiator (manufactured by BASF, "IRGACURE184"), and 29.3 parts by mass of carbon black (manufactured by Asahi Carbon Co., Ltd., "SUNBLACK X15") were dissolved in methyl ethyl ketone (manufactured by Kishida Chemical Co., Ltd.) so that the solid content concentration reached 30 mass %, mixed together, and then uniformly dispersed with a sand mill.

Methyl ethyl ketone was added to this mixed liquid so that the solid content concentration was adjusted to 25.0 mass %, a material shown in the row of roughness-forming particles in Tables 4-1 and 4-2 was added thereto, and the materials were stirred and dispersed with a ball mill, thereby obtaining a paint for a resin layer 26. The elastic roller was immersed in and coated with this paint, whereby the paint was applied so that the film thickness of a resin layer reached 15 μm and cured by five-second UV irradiation at a UV irradiation intensity of 1500 mW/$cm^2$, thereby forming a resin layer. On the obtained electrophotographic roller, the evaluations were performed by the same methods as in Example 1. The evaluation results are shown in Tables 6-1 and 6-2.

Comparative Example 11

An electrophotographic roller was an electrophotographic roller described in the examples of Japanese Patent Application Publication No. 2020-166227, and a modified silicone compound was used as a paint for a resin layer instead of the Silicone and/or fluorine acrylic. By the same methods as in Example 1 except for what has been described above, a paint for a resin layer and an impregnation treatment liquid were prepared with materials shown in Tables 4-1 and 4-2 and Table 5, and furthermore, an electrophotographic roller was produced in combinations shown in Tables 6-1 and 6-2. On the obtained electrophotographic roller, the respective evaluations were performed by the same methods as in Example 1. The evaluation results are shown in Tables 6-1 and 6-2.

Comparative Example 12

A surface modifier A described in the examples of Japanese Patent No. 6510936 was used a material for a paint for a resin layer, a paint for a resin layer was prepared with materials shown in Tables 4-1 and 4-2, and an impregnation treatment liquid was prepared with materials shown in Table 5. Furthermore, an electrophotographic roller was produced in combinations shown in Tables 6-1 and 6-2. The surface modifier A was the same surface modifier as produced in Comparative Example 6. On the obtained electrophotographic roller, the respective evaluations were performed by the same methods as in Example 1. The evaluation results are shown in Tables 6-1 and 6-2.

TABLE 4-1

| | | Paint for resin layer No. | | | | | | | | | | | | | |
|---|---|---|---|---|---|---|---|---|---|---|---|---|---|---|---|
| Classification | Material name | 1 | 2 | 3 | 4 | 5 | 6 | 7 | 8 | 9 | 10 | 11 | 12 | 13 | 14 |
| Polyol | PTGL1000 | 100 | 100 | 100 | — | — | — | 100 | 100 | — | — | — | — | 100 | 100 |
| | PTGL3500 | — | — | — | 100 | 100 | 100 | — | — | — | — | — | — | — | — |
| | PTMG650 | — | — | — | — | — | — | — | — | 100 | 100 | 100 | 100 | — | — |
| | US-270 | — | — | — | — | — | — | — | — | — | — | — | — | — | — |
| Isocyanate | MR-400 | 36.0 | 36.0 | 36.0 | 6.3 | 6.3 | 6.3 | 36.0 | 36.0 | 36.0 | 36.0 | 36.0 | 36.0 | 36.0 | 36.0 |
| Urethane-based | UV3200B | — | — | — | — | — | — | — | — | — | — | — | — | — | — |
| (meth)acrylate | AMO | — | — | — | — | — | — | — | — | — | — | — | — | — | — |
| | IBXA | — | — | — | — | — | — | — | — | — | — | — | — | — | — |
| | BEPG-A | — | — | — | — | — | — | — | — | — | — | — | — | — | — |
| Carbon black | SUNBLACK X15 | 29.3 | 29.3 | 29.3 | 26.3 | 26.3 | 26.3 | 29.3 | 29.3 | 29.3 | 29.3 | 29.3 | 29.3 | 29.3 | 29.3 |
| Monool component | 50HB-100 | 3.0 | 3.0 | 3.0 | 3.0 | 3.0 | 3.0 | 3.0 | 3.0 | 3.0 | 3.0 | 3.0 | 3.0 | 3.0 | 3.0 |
| Roughness-forming particle | UCN-5090 | 17.6 | 17.6 | 17.6 | 15.8 | 15.8 | 15.8 | 17.6 | 17.6 | 17.6 | 17.6 | 17.6 | 17.6 | 17.6 | 17.6 |
| Silicone acrylic | EBECRYL1360 | 4.9 | — | — | 1.6 | — | — | — | — | 5.7 | — | 6.2 | — | — | — |
| | KBM 503 | — | — | — | — | — | — | 4.9 | — | — | — | — | — | 4.6 | — |
| | KP-423 | — | — | — | — | — | — | — | — | — | — | — | — | — | — |
| | KP-415 | — | — | — | — | — | — | — | — | — | — | — | — | — | — |
| Fluorine acrylic | EBECRYL8110 | — | 4.9 | — | — | 1.6 | — | — | — | — | 5.7 | - | 6.2 | — | — |
| | Viscoat 8FM | — | — | — | — | — | — | — | 4.9 | — | — | — | — | — | 4.2 |
| Silicone/fluorine | X-12-2430C | — | — | 4.9 | — | — | 1.6 | — | — | — | — | — | — | — | — |
| acrylic | Surface modifier A | — | — | — | — | — | — | — | — | — | — | — | — | — | — |
| Modified Si compound | TSF4445 | — | — | — | — | — | — | — | — | — | — | — | — | — | — |
| Photopolymerization initiator | Omnirad184 | — | — | — | — | — | — | — | — | — | — | — | — | — | — |

TABLE 4-2

| Classification | Material name | Paint for resin layer No. | | | | | | | | | | | | |
|---|---|---|---|---|---|---|---|---|---|---|---|---|---|---|
| | | 15 | 16 | 17 | 18 | 19 | 20 | 21 | 22 | 23 | 24 | 25 | 26 | 27 |
| Polyol | PTGL1000 | — | — | — | — | — | — | — | 100 | 100 | 100 | 100 | — | 100 |
| | PTGL3500 | — | — | — | — | — | — | — | — | — | — | — | — | — |
| | PTMG650 | 100 | 100 | 100 | 100 | 100 | 100 | 100 | — | — | — | — | — | — |
| | US-270 | — | — | — | — | — | — | — | — | — | 5.3 | — | — | — |
| Isocyanate | MR-400 | 36.0 | 36.0 | 36.0 | 36.0 | 36.0 | 36.0 | 36.0 | 36.0 | 36.0 | 37.9 | 36.0 | - | 36.0 |
| Urethane-based (meth)acrylate | UV3200B | — | — | — | — | — | — | — | — | — | — | — | 60.0 | — |
| | AMO | — | — | — | — | — | — | — | — | — | — | — | 20.0 | — |
| | IBXA | — | — | — | — | — | — | — | — | — | — | — | 20.0 | — |
| | BEPG-A | — | — | — | — | — | — | — | — | — | — | — | 5.0 | — |
| Carbon black | SUNBLACK X15 | 29.3 | 29.3 | 29.3 | 29.3 | 29.3 | 45.6 | 29.3 | 29.3 | 60.9 | 29.3 | 29.3 | 29.3 | 29.3 |
| Monool component | 50HB-100 | 3.0 | 3.0 | 3.0 | 3.0 | 3.0 | 3.0 | 3.0 | 3.0 | 3.0 | 3.0 | 3.0 | — | 3.0 |
| Roughness-forming particle | UCN-5090 | 17.6 | 17.6 | 17.6 | 17.6 | 17.6 | 17.6 | 17.6 | 17.6 | 17.6 | 17.6 | 17.6 | 17.6 | 17.6 |
| Silicone acrylic | EBECRYL1360 | 7.3 | — | 8.2 | — | — | — | — | — | — | — | — | — | — |
| | KBM503 | — | — | — | — | — | — | — | — | — | — | — | — | — |
| | KP-423 | — | — | — | — | 4.9 | 4.9 | — | — | — | — | — | — | — |
| | KP-415 | — | — | — | — | — | — | 4.9 | — | 4.9 | — | — | — | — |
| Fluorine acrylic | EBECRYL8110 | — | 7.3 | — | 8.2 | — | — | — | — | — | — | — | — | — |
| | Viscoat 8FM | — | — | — | — | — | — | — | — | — | — | — | — | — |
| Silicone/fluorine acrylic | X-12-2430C | — | — | — | — | — | — | — | — | — | — | — | — | — |
| | Surface modifier A | — | — | — | — | — | — | — | — | — | — | 3.6 | — | — |
| Modified Si compound | TSF4445 | — | — | — | — | — | — | — | — | — | — | — | — | 0.6 |
| Photopolymerization initiator | Omnirad184 | — | — | — | — | — | — | — | — | — | — | — | 1.0 | — |

* Numbers in the table indicate the amounts of individual materials blended in "parts by mass."

* Materials shown in the table are each as described below.

"PTGL1000": trade name; polyol manufactured by Hodogaya Chemical Co., Ltd.

"PTGL3500": trade name; polyol manufactured by Hodogaya Chemical Co., Ltd.

"PTMG650": trade name; polyol manufactured by Hodogaya Chemical Co., Ltd.

"US-270": trade name; silicone graft acrylic polyol manufactured by Toagosei Co., Ltd.

"MR-400" (MILLIONATE MR-400): trade name; isocyanate compound (polymeric MDI) manufactured by Tosoh Corporation "UV3200B": trade name; urethane acrylate oligomer manufactured by The Nippon Synthetic Chemical Industry Co., Ltd.

"AMO": trade name; polar group-containing acrylate monomer manufactured by Shin-Nakamura Chemical Co., Ltd.

"IBXA": trade name; bulky substituent-containing acrylate monomer manufactured by Kyoeisha Chemical Co., Ltd., "BEPG-A": trade name: 2-butyl-2-ethyl-1,3-propanediol diacrylate manufactured by Kyoeisha Chemical Co., Ltd.

"SUNBLACK X15": trade name; carbon black (volatile matter content: 2.1%) manufactured by Asahi Carbon Co., Ltd.

"50HB-100" (NEWPOL 50HB-100): trade name; monool (poly(oxyethylene oxypropylene)glycol monobutyl ether, molecular weight Mn=510) manufactured by Sanyo Chemical Industries, Ltd.

"UCN-5090" (DYNAMIC BEADS UCN-5090): trade name crosslinked urethane resin particle manufactured by Dainichiseika Color & Chemicals Mfg. Co., Ltd. average particle diameter 9 μm "EBECRYL1360": trade name; silicone hexacrylate manufactured by Daicel-Allnex Ltd.

"KBM503": trade name; 3-methacryloxypropyltrimethoxysilane manufactured by Shin-Etsu Chemical Co., Ltd.

"KP-423": trade name; silicone acrylate (dual-end type) manufactured by Shin-Etsu Chemical Co., Ltd.

"KP-415": trade name; silicone methacrylate (dual-end type) manufactured by Shin-Etsu Chemical Co., Ltd.

"EBECRYL8110": trade name; fluorine-modified acrylate manufactured by Daicel-Allnex Ltd.

"VISCOAT 8FM": trade name; 1H,1H,5H-octafluoropentyl methacrylate manufactured by Osaka Organic Chemical Industry Ltd.

"X-12-2430C": trade name; fluorine/acrylic-modified organopolysiloxane manufactured by Shin-Etsu Chemical Co., Ltd.

"Surface modifier A": surface modifier A described in the examples of Japanese Patent No. 6510936

"TSF4445": trade name; modified silicone compound manufactured by Momentive Performance Materials group "Omnirad184": trade name; photopolymerization initiator manufactured by IGM Resins B.V.

TABLE 5

| Classification | Material name | Impregnation treatment liquid No. | | | | |
|---|---|---|---|---|---|---|
| | | 1 | 2 | 3 | 4 | 5 |
| Acrylic monomer | EBECRYL145 | 5.0 | — | — | — | — |
| | TMPTA | — | 1.0 | — | — | — |
| | Pentaerythritol triacrylate | — | — | 23.8 | 23.8 | 23.8 |

TABLE 5-continued

| Classification | Material name | Impregnation treatment liquid No. 1 | 2 | 3 | 4 | 5 |
|---|---|---|---|---|---|---|
| Si/F acrylic polymer | Photopolymerizable polymer A | — | — | 1.2 | 0.9 | 0.6 |
| Photopolymerization initiator | Omnirad184 | 0.25 | 0.25 | 1.19 | 1.19 | 1.19 |
| Solvent | Methyl ethyl ketone | 100 | 100 | 100 | 100 | 100 |

* Numbers in the table indicate the amounts of individual materials blended in "parts by mass."
* Materials shown in the table are each as described below.
"EBECRYL145": trade name; difunctional acrylic monomer manufactured by Daicel-Allnex Ltd.
"TMPTA": trade name; trifunctional acrylic monomer manufactured by Daicel-Allnex Ltd.
"Pentaerythritol triacrylate": trade name; trifunctional acrylic monomer manufactured by Shin-Nakamura Chemical Co., Ltd.
Photopolymerizable polymer A: photopholymerizable polymer A described in the examples of Japanese Patent No. 5968257
"Omnirad184": trade name; photopolymerization initiator manufactured by IGM Resins B.V.

TABLE 6-1

| Example No. | paint for a resin layer No. | Impregnation treatment liquid No. | Volume resistivity (Q · cm) | Surface potential maximum value (V) | Ionization potential (eV) | Presence or absence of crosslinked acrylic resin | E1 (MPa) | E2 (MPa) |
|---|---|---|---|---|---|---|---|---|
| 1 | 1 | 1 | $3.2 \times 10^8$ | 3.2 | 5.5 | Present | 350 | 40 |
| 2 | 2 | 1 | $4.0 \times 10^8$ | 3.5 | 5.5 | Present | 350 | 40 |
| 3 | 3 | 1 | $7.6 \times 10^8$ | 4.4 | 5.6 | Present | 350 | 40 |
| 4 | 4 | 2 | $1.3 \times 10^8$ | 3.0 | 5.3 | Present | 200 | 10 |
| 5 | 5 | 2 | $2.2 \times 10^8$ | 3.3 | 5.3 | Present | 200 | 10 |
| 6 | 6 | 2 | $4.8 \times 10^8$ | 4.2 | 5.4 | Present | 200 | 10 |
| 7 | 1 | 2 | $3.9 \times 10_8$ | 5.8 | 5.5 | Present | 500 | 100 |
| 8 | 2 | 2 | $4.1 \times 10^8$ | 6.2 | 5.5 | Present | 500 | 100 |
| 9 | 3 | 2 | $7.5 \times 10^8$ | 7.0 | 5.6 | Present | 500 | 100 |
| 10 | 7 | 1 | $3.5 \times 10^8$ | 5.3 | 5.1 | Present | 400 | 130 |
| 11 | 8 | 1 | $3.9 \times 10^8$ | 5.6 | 5.2 | Present | 400 | 130 |
| 12 | 9 | 1 | $4.5 \times 10^8$ | 8.2 | 5.5 | Present | 620 | 130 |
| 13 | 10 | 1 | $5.3 \times 10^8$ | 7.6 | 5.5 | Present | 620 | 130 |
| 14 | 11 | 1 | $6.3 \times 10^8$ | 9.5 | 5.5 | Present | 620 | 130 |
| 15 | 12 | 1 | $6.3 \times 10^8$ | 9.1 | 5.5 | Present | 620 | 130 |
| 16 | 13 | 1 | $3.1 \times 10^8$ | 4.9 | 5.0 | Present | 380 | 140 |
| 17 | 14 | 1 | $3.5 \times 10^8$ | 5.2 | 5.0 | Present | 380 | 140 |
| 18 | 15 | 1 | $3.6 \times 10^8$ | 13.5 | 5.5 | Present | 650 | 130 |
| 19 | 16 | 1 | $3.6 \times 10^8$ | 14.4 | 5.5 | Present | 650 | 130 |
| 20 | 17 | 1 | $6.8 \times 10^8$ | 17.5 | 5.5 | Present | 700 | 130 |
| 21 | 18 | 1 | $7.0 \times 10^8$ | 18.3 | 5.5 | Present | 700 | 130 |
| 22 | 19 | 1 | $7.3 \times 10^8$ | 18.9 | 5.5 | Present | 700 | 130 |
| 23 | 19 | 1 | $7.4 \times 10^8$ | 18.9 | 5.5 | Present | 700 | 130 |
| 24 | 19 | 1 | $8.3 \times 10^8$ | 19.6 | 5.5 | Present | 700 | 130 |
| 25 | 20 | 1 | $3.6 \times 10^6$ | 8.9 | 5.5 | Present | 700 | 130 |
| C.E. 1 | 21 | 1 | $8.5 \times 10^8$ | 24.5 | 5.5 | Present | 700 | 130 |
| C.E. 2 | 22 | 1 | $1.9 \times 10^8$ | 3.1 | 4.8 | Present | 320 | 150 |
| C.E. 3 | 1 | — | $1.5 \times 10^8$ | 3.0 | 5.5 | Absent | 20 | 20 |
| C.E. 4 | 23 | 1 | $5.5 \times 10^5$ | 1.8 | 5.5 | Present | 650 | 90 |
| C.E. 5 | 24 | 1 | $1.6 \times 10^9$ | 4.9 | 4.8 | Present | 370 | 60 |
| C.E. 6 | 25 | — | $8.3 \times 10^8$ | 45.6 | 5.5 | Present | 80 | 80 |
| C.E. 7 | 22 | 3 | $1.6 \times 10^9$ | 70.6 | 5.6 | Present | 4500 | 4500 |
| C.E. 8 | 22 | 4 | $9.8 \times 10^8$ | 59.3 | 5.6 | Present | 4500 | 4500 |
| C.E. 9 | 22 | 5 | $9.1 \times 10^8$ | 32.1 | 4.9 | Present | 350 | 20 |
| C.E. 10 | 26 | — | $3.5 \times 10^9$ | 6.3 | 5.0 | Present | 20 | 20 |
| C.E. 11 | 27 | 1 | $1.9 \times 10^8$ | 2.2 | 4.8 | Present | 350 | 40 |
| C.E. 12 | 25 | 1 | $6.9 \times 10^8$ | 52.3 | 4.8 | Present | 350 | 20 |

TABLE 6-2

| Example No. | A1 | A2 | Presence or absence of IPN | Surface modifier molecular wight (Mw) | Presence or absence of Si and F | Amount of Si present (atm %) | Amount of F present (atm %) | Drying after impregnation treatment (min) | Fogging | Image density stability |
|---|---|---|---|---|---|---|---|---|---|---|
| 1 | 395 | 392 | Present | 1100 | Present | 8.8 | — | 5 | 0.82 | 0.02 |
| 2 | 395 | 392 | Present | 1500 | Present | — | 8.4 | 5 | 0.83 | 0.02 |
| 3 | 395 | 392 | Present | 2000 | Present | 8.5 | 9.2 | 5 | 0.86 | 0.02 |
| 4 | 394 | 391 | Present | 1100 | Present | 7.1 | — | 5 | 0.81 | 0.02 |
| 5 | 394 | 391 | Present | 1500 | Present | — | 8.0 | 5 | 0.80 | 0.02 |
| 6 | 394 | 391 | Present | 2000 | Present | 7.1 | 5.1 | 5 | 0.82 | 0.02 |
| 7 | 397 | 394 | Present | 1100 | Present | 12.1 | — | 5 | 0.87 | 0.03 |
| 8 | 397 | 394 | Present | 1500 | Present | — | 12.8 | 5 | 0.88 | 0.04 |
| 9 | 397 | 394 | Present | 2000 | Present | 11.9 | 12.1 | 5 | 0.90 | 0.05 |
| 10 | 396.5 | 395 | Present | 250 | Present | 5.2 | — | 5 | 0.81 | 0.03 |
| 11 | 396.5 | 395 | Present | 300 | Present | — | 5.5 | 5 | 0.80 | 0.03 |
| 12 | 396.5 | 395 | Present | 1100 | Present | 9.8 | — | 5 | 1.01 | 0.05 |
| 13 | 396.5 | 395 | Present | 1500 | Present | — | 9.9 | 5 | 1.09 | 0.05 |
| 14 | 396.5 | 395 | Present | 1100 | Present | 10.9 | — | 5 | 1.11 | 0.06 |
| 15 | 396.5 | 395 | Present | 1500 | Present | — | 10.7 | 5 | 1.11 | 0.06 |
| 16 | 396.5 | 395 | Present | 250 | Present | 5.0 | — | 5 | 1.02 | 0.02 |
| 17 | 396.5 | 395 | Present | 300 | Present | — | 5.0 | 5 | 1.04 | 0.03 |
| 18 | 397 | 394 | Present | 1100 | Present | 15.0 | — | 5 | 1.16 | 0.07 |
| 19 | 397 | 394 | Present | 1500 | Present | — | 15.0 | 5 | 1.18 | 0.08 |
| 20 | 397 | 394 | Present | 1100 | Present | 18.2 | — | 5 | 1.28 | 0.09 |
| 21 | 397 | 394 | Present | 1500 | Present | — | 17.8 | 5 | 1.30 | 0.10 |
| 22 | 397 | 394 | Present | 2500 | Present | 18.0 | — | 5 | 1.62 | 0.10 |
| 23 | 397 | 394 | Present | 2500 | Present | 18.2 | — | 15 | 1.63 | 0.10 |
| 24 | 397 | 394 | Present | 2500 | Present | 19.8 | — | 30 | 1.69 | 0.12 |
| 25 | 397 | 394 | Present | 2500 | Present | 19.3 | — | 30 | 3.23 | 0.05 |
| C.E. 1 | 397 | 394 | Present | 4000 | Present | 18.5 | — | 30 | 3.55 | 0.15 |
| C.E. 2 | 395 | 392 | Present | — | Absent | — | — | 30 | 0.86 | 0.17 |
| C.E. 3 | 392 | 392 | Absent | 1100 | Present | 10.8 | — | 30 | 1.23 | 0.19 |
| C.E. 4 | 395 | 392 | Present | 1100 | Present | 10.1 | — | 30 | 4.86 | 0.01 |
| C.E. 5 | 395 | 392 | Present | — | Present | 8.1 | — | 30 | 1.32 | 0.17 |
| C.E. 6 | 396 | 395 | Present | 56000 | Present | 14.5 | 3.5 | 5 | 3.32 | 0.20 |
| C.E. 7 | 397 | 396 | Present | — | Present | 23.5 | 5.7 | 30 | 4.36 | 0.31 |
| C.E. 8 | 397 | 396 | Present | — | Present | 19.5 | 4.7 | 30 | 3.98 | 0.26 |
| C.E. 9 | 395 | 392 | Present | — | Present | 10.2 | 4.1 | 30 | 3.32 | 0.16 |
| C.E. 10 | 395 | 395 | Absent | 500 | Present | 4.1 | — | 5 | 1.55 | 0.17 |
| C.E. 11 | 395 | 392 | Present | — | Present | 8.1 | — | 30 | 0.84 | 0.17 |
| C.E. 12 | 395 | 392 | Present | 56000 | Present | 9.8 | 4.6 | 30 | 3.62 | 0.22 |

In the tables, "C.E." indicates "Comparative Example", A1 is the above-described peak top temperature A1 (C), and A2 is the above-described peak top temperature A2 (° C.).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-010957, filed Jan. 29, 2024, which is hereby incorporated by reference herein in its entirety.

What is claimed is:

1. An electrophotographic roller, comprising:

a substrate having a conductive outer surface; and a resin layer that is present on a side of the conductive outer surface of the substrate, wherein a volume resistivity is $1.0\times10^6$ Q·cm or higher when a metal film is directly provided on an outer surface of the electrophotographic roller and a direct voltage of 50 V is applied thereto under an environment of a temperature of 23° C. and a relative humidity of 50%, a maximum value of potentials is lower than 20.0 V when a corona discharger having a 3.0 mm-wide grid part is disposed under an environment of a temperature of 23° C. and a relative humidity of 50% such that a distance between the grid part and the outer surface of the electrophotographic roller reaches 1.0 mm and a width direction of the grid part and an axial direction of the electrophotographic roller coincide with each other, a voltage of 8 kV is applied to the grid part, the corona discharger is relatively moved along the axial direction of the electrophotographic roller at a rate of 400 mm/second to charge the outer surface of the electrophotographic roller, and potentials of the outer surface of the electrophotographic roller are measured 0.06 seconds after passage of the grid part, when an object is irradiated with an ultraviolet ray at a light intensity of 800 nW, and a threshold energy of photoelectron emission at which an ionization potential measurement curve rapidly rises is regarded as an ionization potential, the ionization potential of the outer surface of the electrophotographic roller is 5.0 to 5.6 eV, and an elastic modulus E1 in a region from the outer surface of the electrophotographic roller to a depth of 0.1 µm that is measured in a thickness-direction cross section of the resin layer of the electrophotographic roller is 200 MPa or higher.

2. The electrophotographic roller according to claim 1, wherein the resin layer comprises a crosslinked urethane resin and a crosslinked acrylic resin.

3. The electrophotographic roller according to claim 2, wherein the crosslinked acrylic resin comprises at least one member selected from the group consisting of silicone and fluorine in a molecule.

4. The electrophotographic roller according to claim 3, wherein at least one of a proportion of a detection value of Si and a proportion of a detection value of F based on a total of detection values of F, C, O, Si and N when an outer surface of the resin layer is measured by electron spectroscopy for chemical analysis is 5.0 to 15.0 Atomic %, and neither the proportion of the detection value of Si nor the proportion of the detection value of F exceed 15.0 Atomic %.

5. The electrophotographic roller according to claim 2, wherein the crosslinked urethane resin and the crosslinked acrylic resin form an interpenetrating polymer network structure in the resin layer.

6. The electrophotographic roller according to claim 1, wherein an elastic modulus E2 is 1 to 100 MPa in a region 1.0 to 1.1 μm deep from the outer surface of the electrophotographic roller measured in a thickness-direction cross section of the resin layer of the electrophotographic roller.

7. The electrophotographic roller according to claim 1, wherein an outer surface of the resin layer is the outer surface of the electrophotographic roller.

8. The electrophotographic roller according to claim 1, wherein the electrophotographic roller is a developing roller that is configured to supply a toner to an electrostatic latent image formed on a photosensitive member.

9. A process cartridge that is configured to be detachable from a main body of an electrophotographic image forming apparatus, the process cartridge comprising:

a toner;

a developing roller;

a toner layer thickness-regulating member that is at least partially conductive, and is configured to contact the developing roller, and regulate a layer thickness of the toner that is carried on the developing roller, and a contact point electrically connected to the toner layer thickness-regulating member, wherein the contact point is electrically connected to a main body contact point of the main body of the electrophotographic image forming apparatus and is configured to enable providing a predetermined voltage to the toner layer thickness-regulating member when the process cartridge has been mounted in the main body of the electrophotographic image forming apparatus, and the developing roller is the electrophotographic roller according to claim 1.

10. The process cartridge according to claim 9, wherein the toner is a negatively-charged toner.

11. An electrophotographic image forming apparatus, comprising:

a photosensitive member;

a toner; and a developing roller configured to supply the toner to an electrostatic latent image formed on the photosensitive member, wherein the developing roller is the electrophotographic roller according to claim 1.

12. The electrophotographic image forming apparatus according to claim 11, wherein the toner is a negatively-charged toner.

13. A method for manufacturing the electrophotographic roller according to claim 1, comprising the steps of:

preparing the substrate having a conductive outer surface; and forming the resin layer on a side of the outer surface of the substrate, comprising applying and curing an urethane raw material mixture comprising an urethane raw material that forms the crosslinked urethane resin and a surface modifier, to obtain a crosslinked urethane resin, wherein the surface modifier has a weight-average molecular weight Mw of 200 to 3000.

* * * * *